US012470933B1

(12) United States Patent
Mikulskij et al.

(10) Patent No.: US 12,470,933 B1
(45) Date of Patent: Nov. 11, 2025

(54) SECURE SUBSCRIBER IDENTIFICATION MODULE NETWORKING SERVICE

(71) Applicant: UAB 360 IT, Vilnius (LT)

(72) Inventors: Kiril Mikulskij, Vilnius (LT);
Emanuelis Norbutas, Vilnius (LT);
Vykintas Maknickas, Vilnius (LT)

(73) Assignee: UAB 360 IT, Vilnius (LT)

( * ) Notice: Subject to any disclaimer, the term of this patent is extended or adjusted under 35 U.S.C. 154(b) by 0 days.

(21) Appl. No.: 19/199,225

(22) Filed: May 5, 2025

Related U.S. Application Data

(63) Continuation of application No. 19/078,980, filed on Mar. 13, 2025.

(60) Provisional application No. 63/722,216, filed on Nov. 19, 2024.

(51) Int. Cl.
*H04L 9/28* (2006.01)
*H04L 9/40* (2022.01)
*H04W 8/18* (2009.01)
*H04W 12/06* (2021.01)
*H04W 12/30* (2021.01)
*H04L 12/46* (2006.01)

(52) U.S. Cl.
CPC ......... *H04W 12/35* (2021.01); *H04L 63/0853* (2013.01); *H04L 63/20* (2013.01); *H04W 8/183* (2013.01); *H04W 12/06* (2021.01); *H04L 12/4641* (2013.01)

(58) Field of Classification Search
None
See application file for complete search history.

(56) References Cited

U.S. PATENT DOCUMENTS

2018/0063697 A1   3/2018   Li et al.

FOREIGN PATENT DOCUMENTS

WO   WO-2024023628 A1 *  2/2024  ........... H04L 9/3265

* cited by examiner

Primary Examiner — Gary Lafontant
(74) Attorney, Agent, or Firm — Young Basile Hanlon & MacFarlane, P.C.

(57) ABSTRACT

An intermediary system between an access network and a target may receive a communication originating from a client and directed to the target. The intermediary system may generate, based a subscriber identification module (SIM) security service, a secure communication. The intermediary system may provide the secure communication to the target.

20 Claims, 13 Drawing Sheets

SECURE SUBSCRIBER IDENTIFICATION MODULE NETWORKING SERVICE

CROSS REFERENCE TO RELATED APPLICATIONS

This application is a continuation of U.S. patent application Ser. No. 19/078,980, filed Mar. 13, 2025, which claims the benefit of U.S. Provisional Patent Application Ser. No. 63/722,216, filed Nov. 19, 2024, the entire disclosures of which are incorporated herein by reference.

BACKGROUND

Computing devices, and users thereof, use wireless services to access content. In some cases, the wireless services are provided via a subscriber identification module (SIM) networking service or an embedded SIM (eSIM) networking service.

SUMMARY

Disclosed herein are one or more examples of implementations associated with a secure SIM networking service.

According to an aspect of the present disclosure, a method is provided. The method includes receiving, by an intermediary system between an access network and a target, a communication originating from a client device and directed to a target. The method includes generating a secure communication based on application of a subscriber identification module (SIM) security service to the communication. The method includes providing the secure communication to the target.

According to another aspect of the present disclosure, a device is provided. The device includes one or more memories, and one or more processors communicatively coupled with the one or more memories. The one or more processors are configured to execute instructions stored in the one or more memories to cause the device to receive, from a client device and by an intermediary system between an access network and a target, a client request associated with a target; receive, from the client device, a communication addressed to the target; apply, based on the client request, a subscriber identification module (SIM) security service to the communication to generate a secure communication; and provide the secure communication to the target.

According to another aspect of the present disclosure, one or more non-transitory computer-readable media storing instructions operable to cause one or more processors to perform operations are provided. The operations include receiving, by an intermediary system between a service provider and a target, a communication originating from a client device and directed to a target; generating a secure communication based on a subscriber identification module (SIM) security service; and providing the secure communication to the target.

These and other objects, features, and characteristics of the apparatus, system, and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
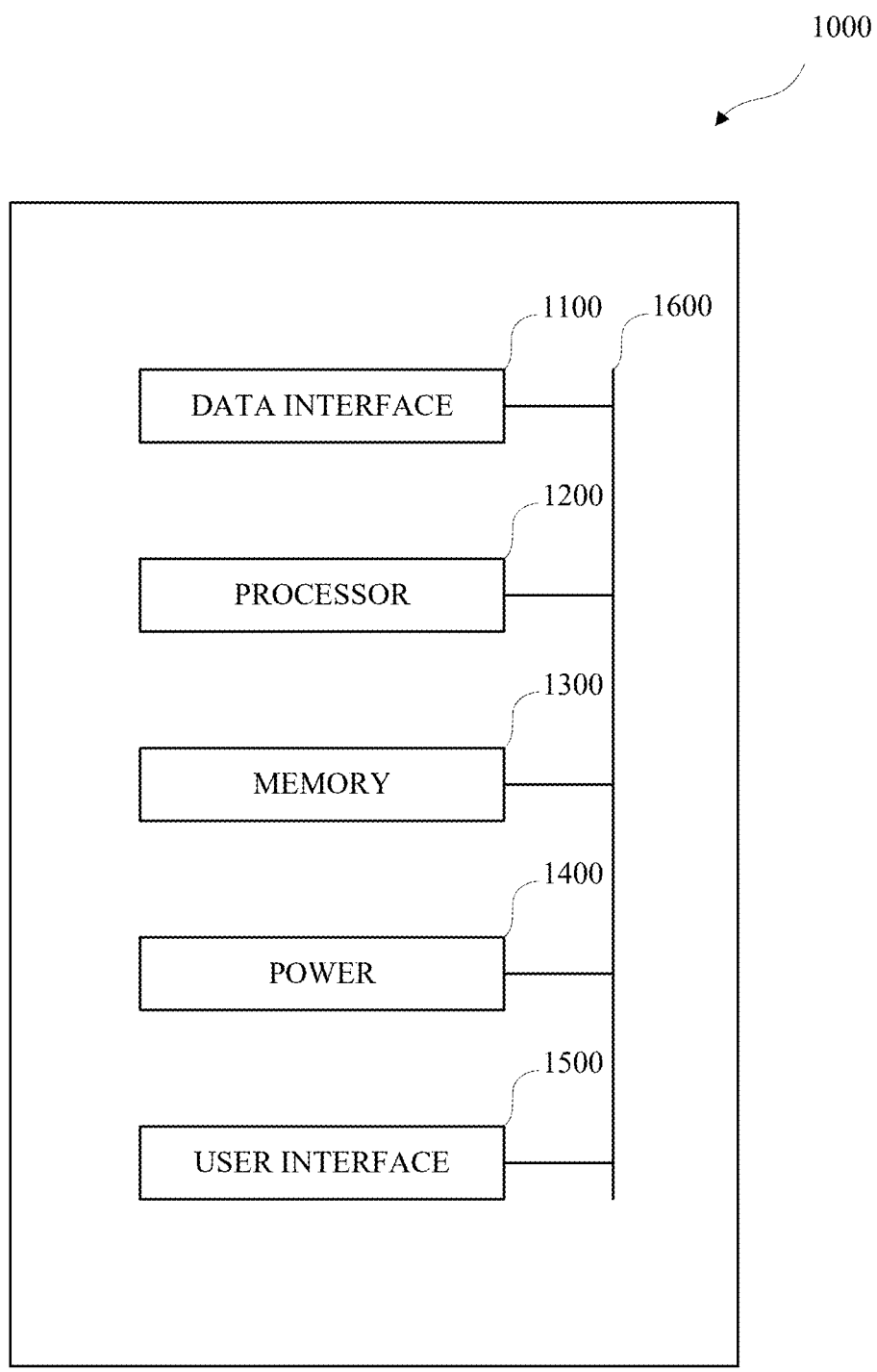
FIG. 1 is a block diagram of an example of a computing device.

Wireless networking has revolutionized the way devices connect and communicate, allowing for seamless access to digital content and services without the need for physical connections. In traditional cellular networks, a subscriber identification module (SIM) card is used to authenticate and identify a user's device on the network. SIM technology may include traditional removable SIM cards or embedded SIM (eSIM) technology integrated directly into a device's hardware. SIMs offer functionality for securely storing subscription and identity information essential for accessing cellular networks. Traditional removable SIM cards provide a physical component that can be swapped between devices, while eSIMs offer greater flexibility by allowing users to switch between network providers without physically changing SIM cards.

While traditional SIM cards provided a physical barrier to unauthorized access, SIMs, particularly eSIMs being programmable and remotely manageable, may present a more complex security landscape. The integration of SIM functionality directly into device hardware, while offering flexibility, may also expose users to potential vulnerabilities in the digital realm. These challenges may be particularly acute in an era where cyber threats are increasingly sophisticated and pervasive.

The current SIM setup may offer limited protection against online threats such as phishing, malware, or privacy risks that arise from direct exposure to the internet. Existing security mechanisms may primarily focus on securing the transmission of data between the device and the mobile network, potentially leaving users vulnerable to a wide array of cyber threats once their traffic reaches the broader internet. Moreover, users may lack options for enhanced privacy controls, such as the ability to mask their location by choosing an exit country for their network traffic. This absence of integrated safeguards that proactively block threats and provide users with granular control over their online privacy may represent a gap in the current SIM ecosystem.

Another challenge with SIM implementations may lie in the lack of end-to-end data encryption beyond the initial connection between the device and the mobile network. While SIM connections may encrypt data during the first leg of transmission, they may not provide comprehensive encryption throughout the entire journey of the data across the internet. This limitation may expose user data to potential interception or manipulation at various points along its path, potentially compromising the confidentiality and integrity of sensitive information. Additionally, the current SIM infrastructure may not readily support advanced security features like domain name system (DNS)-based threat protection or flexible routing options that could enhance both security and performance for users.

Implementations of this disclosure may address problems such as these by providing a secure SIM networking service that enhances privacy and security for users of SIM technology. The system may include an intermediary system positioned between an access network and a target, which receives communications originating from a client device and generates secure communications based on a SIM security service. As used herein, the term "intermediary system" refers to a set of interconnected components that may include, but is not limited to, a security service platform, one or more PoPs, and a virtual private network (VPN) infrastructure.

The intermediary system may receive first information associated with the client communication from the service provider and combine it with second information associated with the client to create a comprehensive security profile. This information may include, but is not limited to, a mobile station international subscriber directory number (MSISDN), an integrated circuit card identifier (ICCID), location information, and IP addresses associated with the client or service provider. The system may use this information to apply appropriate security measures and determine optimal routing paths for the client's traffic. For instance, the intermediary system may select a specific PoP based on the client's information and the requirements of the SIM security service.

Some implementations may provide flexible routing options and enhanced privacy controls. Users may specify an exit point for their traffic, which may be associated with a particular VPN server or country. This may allow users to mask their true location and bypass geographic restrictions while maintaining a secure connection. The system may determine the appropriate routing path based on the user's preferences and the SIM security service parameters, transmitting the secure communication to the selected VPN for further processing before reaching the target destination. As used herein, the term "exit point" refers to the final node through which the user's traffic passes before reaching the open internet, which may be located in a different geographic region from the user's actual location.

Some implementations may address the lack of end-to-end encryption in traditional SIM setups by incorporating VPN functionality directly into the network infrastructure. In this way, data may remain encrypted not just between the device and the mobile network, but throughout its journey across the internet. Some implementations may include DNS-based threat protection to proactively block malicious websites and other online threats. A security service platform, which may include an application programming interface (API) and a service engine, may coordinate these security features by generating service information that includes first information, second information, and security indications. As used herein, the term "engine" may include software, hardware, or a combination of software and hardware. An engine may be implemented using software stored in the memory subsystem. Alternatively, an engine may be hard-wired into the processing system. In some cases, an engine includes a combination of software stored in the memory subsystem and hardware that is hard-wired into the processing system. This comprehensive approach may provide users with a secure, private, and flexible SIM networking experience without requiring complex client-side configurations.

FIG. 1 is a block diagram of an example of a computing device 1000. The computing device 1000 may implement, execute, or perform, one or more aspects of the methods and techniques described herein. The computing device 1000 includes a data interface 1100, a processor 1200, memory 1300, a power component 1400, a user interface 1500, and a bus 1600 (collectively, components of the computing device 1000). Although shown as a distinct unit, one or more of the components of the computing device 1000 may be integrated into respective distinct physical units. For example, the processor 1200 may be integrated in a first physical unit and the user interface 1500 may be integrated in a second physical unit. The computing device 1000 may include aspects or components not expressly shown in FIG. 1, such as an enclosure or one or more sensors.

In some implementations, the computing device 1000 may be stationary and/or mobile. For example, the computing device 1000 may be, be similar to, include, or be included in a terminal, an access terminal, a mobile station, or a subscriber unit. In some implementations, the computing device 1000 may be, be similar to, include, or be included in a personal computer (PC), a server, a workstation, a minicomputer, a mainframe computer, or a mobile device, such as a mobile telephone, a cellular phone (for example, a smart phone), a personal digital assistant (PDA), a controller, a smart device, a vehicle, a mobile router, an extended reality device (for example, a virtual reality device, an augmented reality device, or a mixed reality device), a drone, a robot, a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (for example, a smart watch, smart clothing, smart glasses, a smart wristband, smart jewelry (for example, a smart ring or a smart bracelet)), an entertainment device (for example, a music device, a video device, or a satellite radio), a vehicular component or sensor, a smart meter or sensor, industrial manufacturing equipment, a Global Positioning System device (or other position device), a user equipment (UE) function of a network node, or any other suitable device or function that may communicate via a wireless medium.

In some cases, the computing device 1000 may be considered a machine-type communication (MTC) or evolved or enhanced machine-type communication (eMTC) device. An MTC device or an eMTC device may be, be included within, or be coupled with, for example, a robot, a drone, a remote device, a sensor, a meter, a monitor, or a location tag, that may communicate with a network node, another device (for example, a remote device), or some other entity. The computing device 1000 may be considered an Internet-of-Things (IoT) device, or may be implemented as NB-IoT (narrowband IoT) devices. An IoT device or NB-IoT device may be, be included within, or be coupled with, for example, an industrial machine, a refrigerator, a doorbell camera device, a home automation device, and/or a light fixture, among other examples. Some computer devices 1000 may be considered Customer Premises Equipment, which may be telecommunications devices that are installed at a customer location (such as a home or office) to enable access to a service provider's network.

The data interface 1100 communicates, such as transmits, receives, or exchanges, data via one or more wired, or wireless, electronic communication mediums, such as a radio frequency (RF) communication medium, an ultraviolet (UV) communication medium, a visible light communication medium, a fiber optic communication medium, a wireline communication medium, or a combination thereof. For example, the data interface 1100 may include, or may be, a transceiver. Although not shown separately in FIG. 1, the data interface 1100 may include, or may be operatively coupled with, an antenna for wireless electronic communication.

The transceiver and antenna may be configured to facilitate wireless communication using the electromagnetic spectrum, which may be subdivided by frequency or wavelength into various classes, bands, carriers, and/or channels. For example, the data interface 1100 may communicate using one or more operating bands. The data interface 1100 may communicate via a radio access technology (RAT) (which may also be referred to as an air interface) and may operate on one or multiple carrier frequencies in one or multiple frequency ranges such as 410 MHz-7.125 GHz or 24.25 GHz-52.6 GHz, among other examples. Examples of RATs include a 4G RAT, a 5G/NR RAT, and/or a 6G RAT, among other examples. Various operating bands have been defined as frequency range designations FR1 (410 MHz-7.125 GHZ) and FR2 (24.25 GHz-52.6 GHz). Although a portion of FR1 is greater than 6 GHz, FR1 is often referred to (interchangeably) as a "Sub-6 GHz" band in various documents and articles. A similar nomenclature issue sometimes occurs in connection with FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. An operating band for these mid-band frequencies may be referred to as frequency range designation FR3 (7.125 GHz-24.25 GHZ). Frequency bands falling within FR3 may inherit FR1 characteristics or FR2 characteristics, and thus may effectively extend features of FR1 or FR2 into mid-band frequencies. In addition, higher frequency bands may extend 5G NR operation, 6G operation, and/or other RATs beyond 52.6 GHz. For example, three higher operating bands may be referred to as frequency range designations FR4a or FR4-1 (52.6 GHz-71 GHz), FR4 (52.6 GHz-114.25 GHZ), and FR5 (114.25 GHZ-300 GHz). Each of these higher frequency bands falls within the EHF band.

With the above examples in mind, unless specifically stated otherwise, the term "sub-6 GHZ," if used herein, may broadly refer to frequencies that may be less than 6 GHZ, may be within FR1, or may include mid-band frequencies. Further, unless specifically stated otherwise, the term "millimeter wave," if used herein, may broadly refer to frequencies that may include mid-band frequencies, may be within FR2, FR4, FR4-a or FR4-1, or FR5, or may be within the EHF band. It is contemplated that the frequencies included in these operating bands (for example, FR1, FR2, FR3, FR4, FR4-a, FR4-1, or FR5) may be modified, and techniques described herein may be applicable to those modified frequency ranges.

Although not shown separately in FIG. 1, the data interface 1100 may include, or may be operatively coupled with, a wired electronic communication port, such as an Ethernet port, a serial port, or another wired port, that may interface with, or may be operatively coupled to, a wired electronic communication medium. In some implementations, the data interface 1100 may be or may include a network interface card (NIC) or unit, a universal serial bus (USB), a Small Computer System Interface (SCSI), a Peripheral Component Interconnect (PCI), a near field communication (NFC) device, card, chip, or circuit, or another component for electronic data communication between the computing device 1000, or one or more of the components thereof, and one or more external electronic or computing devices. Although shown as one unit in FIG. 1, the data interface 1100 may include multiple physical components, such as a wired data interface and a wireless data interface.

For example, the computing device 1000 may electronically communicate, such as transmit, receive, or exchange computer accessible data, with one or more other computing devices via one or more wired or wireless communications links, or connections, such as via a network, using the data interface 1100, which may include using one or more electronic communication protocols, which may be network protocols, such as Ethernet, Transmission Control Protocol/Internet Protocol (TCP/IP), user datagram protocol (UDP), power line communication (PLC), infrared, ultra violet (UV), visible light, fiber optic, wire line, general packet radio service (GPRS), Global System for Mobile communications (GSM), Universal Mobile Telecommunications System (UMTS), Institute of Electrical and Electronics Engineers (IEEE) standardized protocols, or other suitable protocols. In some implementations, the computing device may communicate, using the data interface 1100, using multiple-access RATs including code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, or time division synchronous code division multiple access (TD-SCDMA) systems.

Various multiple-access technologies such as those above have been incorporated into telecommunication standards to establish common communication protocols that enable wireless devices to interact across municipal, national, regional, or global networks. Examples of such telecommunication standards include Long Term Evolution (LTE), Fourth Generation (4G), New Radio (NR), and subsequent technologies. LTE and 4G have served as foundational advancements in mobile broadband, facilitating significant improvements in data transmission, latency, and network efficiency. NR, commonly referred to as Fifth Generation (5G), represents the next phase in this evolution, developed under the Third Generation Partnership Project (3GPP). These standards, including LTE, 4G, and NR, have been designed to support a diverse range of applications and emerging requirements. For example, LTE and 4G laid the groundwork for wide-scale adoption of mobile broadband services and introduced support for technologies such as carrier aggregation, advanced MIMO systems, and spectrum refarming. Building on these capabilities, NR and its future evolutions have been developed to address additional demands, including enhanced support for IoT deployments, integration of reduced-capability devices, and industrial connectivity. They also enable operation in millimeter wave (mm Wave) frequency bands, access to both licensed and unlicensed spectrum, and the implementation of non-terrestrial networks (NTNs).

Further advancements include the adoption of sidelink and direct device-to-device communication protocols (such as, for example, peer-to-peer (P2P) communication protocols, device-to-device (D2D) communication protocols, vehicle-to-everything (V2X) communication protocols (which may include vehicle-to-vehicle (V2V) protocols, vehicle-to-infrastructure (V2I) protocols, and/or vehicle-to-pedestrian (V2P) protocols), and/or mesh network communication protocols), deployment of massive multiple-input multiple-output (MIMO) systems, support for disaggregated and virtualized network architectures, expanded network topologies, multi-subscriber implementations, and high-precision positioning technologies. LTE, 4G, and NR collectively enable a broad spectrum of applications, ranging from consumer-focused mobile broadband to industrial and enterprise connectivity. As global demand for mobile broadband access continues to grow, continuous improvements to LTE, 4G, and NR are being pursued to enhance their performance and capabilities. Additionally, research and development efforts are underway for new radio access technologies, such as Sixth Generation (6G) systems, to further advance the state of mobile broadband evolution and expand its potential for innovative applications across various industries. In various implementations, the computing device 1000 may be configured to communicate in accordance with any one or more of the above-described technologies.

The processor 1200 is a device, a combination of devices, or a system of connected devices, capable of manipulating or processing an electronic, computer accessible, signal, or other data, such as an optical processor, a quantum processor, a molecular processor, or a combination thereof.

In some implementations, the processor 1200 is implemented as a central processing unit (CPU), such as a microprocessor. In some implementations, the processor 1200 is implemented as one or more special purpose processors, one or more graphics processing units, one or more digital signal processors, one or more microprocessors, one or more controllers, one or more microcontrollers, one or more integrated circuits, one or more Application Specific Integrated Circuits, one or more Field Programmable Gate Arrays, one or more programmable logic arrays, one or more programmable logic controllers, firmware, one or more state machines, or a combination thereof.

The processor 1200 includes one or more processing units. A processing unit may include one or more processing cores. The computing device 1000 may include multiple physical or virtual processing units (collectively, the processor 1200), which may be interconnected, such as via wired, or hardwired, connections, via wireless connections, or via a combination of wired and wireless connections. In some implementations, the processor 1200 is implemented in a distributed configuration including multiple physical devices or units that may be coupled directly or across a network. The processor 1200 includes internal memory (not expressly shown), such as a cache, a buffer, a register, or a combination thereof, for internal storage of data, such as operative data, instructions, or both. For example, the processor 1200 may read data from the memory 1300 into the internal memory (not shown) for processing.

The memory 1300 is a non-transitory computer-usable or computer-readable medium, implemented as a tangible device or component of a device. The memory 1300 contains, stores, communicates, transports, or a combination thereof, data, such as operative data, instructions, or both. For example, the memory 1300 stores an operating system of the computing device 1000, or a portion thereof. The memory 1300 contains, stores, communicates, transports, or a combination thereof, data, such as operative data, instructions, or both associated with implementing, or performing, the methods and techniques, or portions or aspects thereof, described herein. For example, the non-transitory computer-usable or computer-readable medium may be implemented as a solid-state drive, a memory card, removable media, a read-only memory (ROM), a random-access memory (RAM), any type of disk including a hard disk, a floppy disk, an optical disk, a magnetic or optical card, an application-specific integrated circuits (ASICs), or another type of non-transitory media suitable for storing electronic data, or a combination thereof. The memory 1300 may include non-volatile memory, such as a disk drive, or another form of non-volatile memory capable of persistent electronic data storage, such as in the absence of an active power supply. The memory 1300 may include, or may be implemented as, one or more physical or logical units.

The memory 1300 stores executable instructions or data, such as application data, an operating system, or a combination thereof, for access, such as read access, write access, or both, by the other components of the computing device 1000, such as by the processor 1200. The executable instructions may be organized as program modules or algorithms, functional programs, codes, code segments, or combinations thereof to perform one or more aspects, features, or elements of the methods and techniques described herein. The application data may include, for example, user files, database catalogs, configuration information, or a combination thereof. The operating system may be, for example, a desktop or laptop operating system; an operating system for a mobile device, such as a smartphone or tablet device; or an operating system for a large device, such as a mainframe computer. For example, the memory 1300 may be implemented as, or may include, one or more dynamic random-access memory (DRAM) modules, such as a Double Data Rate Synchronous Dynamic Random-Access Memory module, Phase-Change Memory (PCM), flash memory, or a solid-state drive.

The power component 1400 obtains, stores, or both, power, or energy, used by the components of the computing device 1000 to operate. The power component 1400 may be implemented as a general-purpose alternating-current (AC) electric power supply, or as a power supply interface, such as an interface to a household power source or other external power distribution system. In some implementations, the power component 1400 may be implemented as a single use battery or a rechargeable battery such that the computing device 1000 operates, or partially operates, independently of an external power distribution system. For example, the power component 1400 may include a wired power source; one or more dry cell batteries, such as nickel-cadmium (NiCad), nickel-zinc (NiZn), nickel metal hydride (NiMH), lithium-ion (Li-ion); solar cells; fuel cells; or any other device, or combination of devices, capable of powering the computing device 1000.

The user interface 1500 includes one or more units or devices for interfacing with an operator of the computing device 1000, such as a human user. In some implementations, the user interface 1500 obtains, receives, captures, detects, or otherwise accesses, data representing user input to the computing device, such as via physical interaction with the computing device 1000. In some implementations, the user interface 1500 outputs, presents, displays, or otherwise makes available, information, such as to an operator of the computing device 1000, such as a human user.

The user interface 1500 may be implemented as, or may include, a variety of virtual or physical components to facilitate interaction with the computing device 1000. Examples of such components include, but are not limited to, a virtual or physical keypad, a touchpad, or various types of displays, such as liquid crystal displays (LCDs), cathode-ray tube (CRT) displays, light-emitting diode (LED) displays, organic light-emitting diode (OLED) displays, active-matrix organic light-emitting diode (AMOLED) displays, or touch displays. Additionally, the user interface 1500 may include input and output devices such as speakers, microphones, video cameras, sensors, or printers.

The sensors included in the user interface 1500 may encompass a wide array of technologies to support diverse applications. For example, the user interface 1500 may incorporate biological sensors for monitoring health-related metrics such as heart rate, blood pressure, glucose levels, or oxygen saturation, enabling applications in medical diagnostics and fitness tracking. The sensors included in the user interface 1500 may also include augmented reality (AR)-related sensors, such as depth cameras, accelerometers, gyroscopes, or magnetometers, to enhance immersive experiences and interaction with virtual environments Environmental sensors may also be part of the user interface 1500, including temperature sensors, humidity sensors, barometric pressure sensors, air quality sensors, or light sensors, which may be utilized in applications ranging from weather monitoring to smart home automation. The sensors included in the user interface 1500 may further include robotic sensors, such as proximity sensors, force sensors, torque sensors, or vision systems, enabling robotic systems to interact with their surroundings effectively. Additional examples include drone sensors, such as GPS modules, inertial measurement units (IMUs), optical flow sensors, or ultrasonic sensors, to support navigation, obstacle avoidance, or environmental mapping. Actuators, which may include motors, solenoids, piezoelectric devices, or microelectromechanical systems (MEMS), may also form part of the user interface 1500, allowing it to interact dynamically with external systems or environments. In some implementations, a physical user interface 1500 may be omitted, or absent, from the computing device 1000.

The bus 1600 distributes or transports data, power, or both among the components of the computing device 1000 such that the components of the computing device are operatively connected. Although the bus 1600 is shown as one component in FIG. 1, the computing device 1000 may include multiple busses, which may be connected, such as via bridges, controllers, or adapters. For example, the bus 1600 may be implemented as, or may include, a data bus and a power bus. The execution, or performance, of instructions, programs, code, applications, or the like, so as to perform the methods and techniques described herein, or aspects or portions thereof, may include controlling, such as by sending electronic signals to, receiving electronic signals from, or both, the other components of the computing device 1000.

Although not shown separately in FIG. 1, data interface 1100, the power component 1400, or the user interface 1500 may include internal memory, such as an internal buffer or register.

Although an example of a configuration of the computing device 1000 is shown in FIG. 1, other configurations may be used. One or more of the components of the computing device 1000 shown in FIG. 1 may be omitted, or absent, from the computing device 1000 or may be combined or integrated. For example, the memory 1300, or a portion thereof, and the processor 1200 may be combined, such as by using a system on a chip design.

Figure 2:
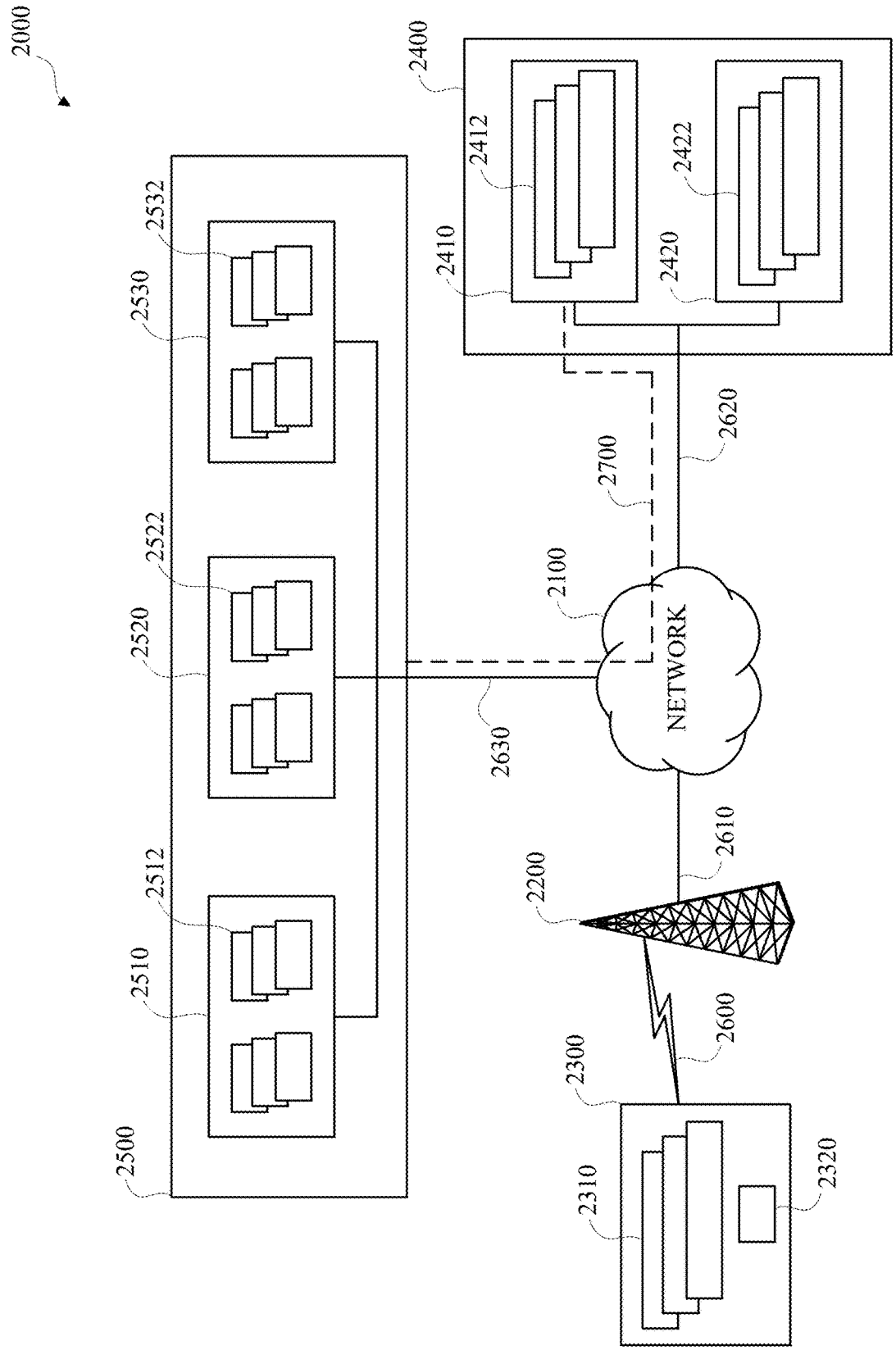
FIG. 2 is a block diagram of an example of a computing and communications system.

FIG. 2 is a diagram of an example of a computing and communications system 2000. The computing and communications system 2000 includes a first network 2100, an access point 2200, a first computing and communications device 2300, a second network 2400, and a third network 2500. The second network 2400 includes a second computing and communications device 2410 and a third computing and communications device 2420. The third network 2500 includes a fourth computing and communications device 2510, a fifth computing and communications device 2520, and a sixth computing and communications device 2530. Other configurations, including fewer or more computing and communications devices, fewer or more networks, and fewer or more access points, may be used.

Each of the first network 2100, the access point 2200, the first computing and communications device 2300, the second network 2400, the third network 2500, the second computing and communications device 2410, the third computing and communications device 2420, the fourth computing and communications device 2510, the fifth computing and communications device 2520, and the sixth computing and communications device 2530 may be generically referred to as a system component. A system component refers to one or more devices and/or applications. Where a system component is or refers to a device, the system component can be, be similar to, include, or be included in a computing system, which can include one or more computing devices (e.g., one or more of the computing device 1000 of FIG. 1). Where a system component is or refers to an application, the system component can be, be similar to, include, or be included in an instance of software running on a device (e.g., a computing device). In some implementations, a system component can be implemented as a single physical unit or as a combination of physical units. In some implementations, a single physical unit can include multiple components One or more of the networks 2100, 2400, 2500 may be, or may include, a local area network (LAN), wide area network (WAN), VPN, a mobile or cellular telephone network, the Internet, or any other means of electronic communication. One or more of the networks 2100, 2400, 2500 may be, or may include, a terrestrial network or a non-terrestrial network (NTN). As used herein, an NTN may refer to a network for which access is facilitated by a non-terrestrial network node and/or a non-terrestrial relay station. An NTN network node may include, or may be included in, a satellite and/or a high-altitude platform (HAP). A HAP may include a balloon, a dirigible, an airplane, and/or an unmanned aerial vehicle, among other examples. An NTN may facilitate network access for remote areas that may not otherwise be within a coverage area of a terrestrial network node, such as over seas, oceans, or remote areas in which a terrestrial network is not deployed. An NTN may provide connectivity for various applications, including satellite communications, IoT, machine type communication, and/or other applications associated with high speed, low latency, and/or high reliability. An NTN may utilize HAPs, low Earth orbit (LEO) satellites, medium Earth orbit (MEO) satellites, and/or geosynchronous (or geostationary) orbit satellites, among other examples.

The networks 2100, 2400, 2500 respectively transmit, receive, convey, carry, or exchange wired or wireless electronic communications using one or more communications protocols, or combinations of communications protocols, the transmission control protocol (TCP), the user datagram protocol (UDP), the internet protocol (IP), the real-time transport protocol (RTP), the HyperText Transport Protocol (HTTP), or a combination thereof. For example, a respective network 2100, 2400, 2500, or respective portions thereof, may be, or may include, a circuit-switched network, or a packet-switched network wherein the protocol is a packet-based protocol. A packet is a data structure, such as a data structure that includes a header, which may contain control data or 'meta' data describing the packet, and a body, or payload, which may contain the substantive data conveyed by the packet.

The access point 2200 may be implemented as, or may include, an NR network node, a 6G network node, a base station, a base transceiver station (BTS), transmission reception point (TRP), a Node-B, an enhanced Node-B (eNode-B), a Home Node-B (HNode-B), a wireless router, a wired router, a hub, a relay, a switch, a bridge, or any similar wired or wireless device. The access point 2200 may also encompass devices with hotspot functionality, allowing them to act as mobile-to-Wi-Fi hotspots or routers. For instance, smartphones may be configured to operate as portable hotspots, enabling connectivity between mobile networks and Wi-Fi-enabled devices. Similarly, other devices, such as connected vehicles, drones, or IoT devices, may be equipped with hotspot features to bridge different network types and extend connectivity in various scenarios.

Although the access point 2200 is shown as a single unit, an access point can include any number of interconnected elements. Although one access point 2200 is shown, fewer or more access points may be used. The access point 2200 may communicate with other communicating devices via wired or wireless electronic communications links or via a sequence of such links. In some configurations, the access point 2200 may form part of a mesh network, where multiple interconnected access points collaborate to provide a distributed and resilient communication infrastructure.

As shown, an access point 2200 may refer to a single physical network node or may collectively refer to two or more physical network nodes. For example, "an access point" or "the access point" may refer to a device or system that implements part of a radio protocol stack, a device or system that implements a full protocol stack (such as a full gNB protocol stack), or a collection of devices or systems that collectively implement a part of the radio protocol stack or the full radio protocol stack. For example, an access point 2200 may be an aggregated network node, meaning that the access point 2200 may utilize a radio protocol stack that is physically and logically integrated within a single network node in the computing and communications system 2000. For example, an access point 2200 (an aggregated network node) may consist of a single standalone base station or a single TRP that may utilize a full radio protocol stack to enable or facilitate communication between a computing and communications device (e.g., a UE) and a core network of or associated with the computing and communications system 2000.

In some implementations, as indicated above, an access point 2200 may refer to a disaggregated network node (sometimes referred to as a disaggregated base station). For example, the access point 2200 may utilize a protocol stack that is physically distributed and/or logically distributed among two or more network nodes in the same geographic location or in different geographic locations. In some implementations, disaggregated access points 2200 may be utilized in an integrated access and backhaul (IAB) network, an open radio access network (O-RAN (such as the network configuration sponsored by the O-RAN Alliance)), or a virtualized radio access network (vRAN, also known as a cloud radio access network (C-RAN)).

As shown, the access point 2200 communicates via a first communications link 2600 with the first computing and communications device 2300. Although the first communications link 2600 is shown as wireless, the first communications link 2600 may be implemented as, or may include, one or more wired or wireless electronic communications links or a sequence of such links, which may include parallel communications links for multipath communications.

As shown, the access point 2200 communicates via a second communications link 2610 with the first network 2100. Although the second communications link 2610 is shown as wired, the second communications link 2610 may be implemented as, or may include, one or more wired or wireless electronic communications links or a sequence of such links, which may include parallel communications links for multipath communications.

As shown, the first network 2100 communicates with the second network 2400 via a third communications link 2620. Although the third communications link 2620 is shown as wired, the third communications link 2620 may be implemented as, or may include, one or more wired or wireless electronic communications links or a sequence of such links, which may include parallel communications links for multipath communications.

As shown, the first network 2100 communicates with the third network 2500 via a fourth communications link 2630. Although the fourth communications link 2630 is shown as wired, the fourth communications link 2630 may be implemented as, or may include, one or more wired or wireless electronic communications links or a sequence of such links, which may include parallel communications links for multipath communications.

The computing and communications devices 2300, 2410, 2420, 2510, 2520, 2530 are, respectively, computing devices, such as the computing device 1000 shown in FIG. 1. For example, the first computing and communications device 2300 may be a user device, such as a mobile computing device or a smartphone, the second computing and communications device 2410 may be a user device, such as a laptop, the third computing and communications device 2420 may be a user device, such as a desktop, the fourth computing and communications device 2510 may be a server, such as a database server, the fifth computing and communications device 2520 may be a server, such as a cluster or a mainframe, and the sixth computing and communications device 2530 may be a server, such as a web server.

The computing and communications devices 2300, 2410, 2420, 2510, 2520, 2530 communicate, or exchange data, such as voice communications, audio communications, data communications, video communications, messaging communications, broadcast communications, or a combination thereof, with one or more of the other computing and communications devices 2300, 2410, 2420, 2510, 2520,

2530 respectively using one or more of the networks 2100, 2400, 2500, which may include communicating using the access point 2200, via one or more of the communications links 2600, 2610, 2620, 2630.

For example, the first computing and communications device 2300 may communicate with the second computing and communications device 2410, the third computing and communications device 2420, or both, via the first communications link 2600, the access point 2200, the second communications link 2610, the network 2100, the third communications link 2620, and the second network 2400. The first computing and communications device 2300 may communicate with one or more of the third computing and communications device 2510, the fourth computing and communications device 2520, the fifth computing and communications device 2520, via the first communications link 2600, the access point 2200, the second communications link 2610, the network 2100, the fourth communications link 2630, and the third network 2500.

For simplicity and clarity, the sequence of communications links, access points, networks, and other communications devices between a sending communicating device and a receiving communicating device may be referred to herein as a communications path. For example, the first computing and communications device 2300 may send data to the second computing and communications device 2410 via a first communications path, or via a combination of communications paths including the first communications path, and the second computing and communications device 2410 may send data to the first computing and communications device 2300 via the first communications path, via a second communications path, or via a combination of communications paths, which may include the first communications path.

The first computing and communications device 2300 includes, such as executes, performs, or operates, one or more applications, or services, 2310. The second computing and communications device 2410 includes, such as executes, performs, or operates, one or more applications, or services, 2412. The third computing and communications device 2420 includes, such as executes, performs, or operates, one or more applications, or services, 2422. The fourth computing and communications device 2510 includes, such as stores, hosts, executes, performs, or operates, one or more documents, applications, or services, 2512. The fifth computing and communications device 2520 includes, such as stores, hosts, executes, performs, or operates, one or more documents, applications, or services, 2522. The sixth computing and communications device 2530 includes, such as stores, hosts, executes, performs, or operates, one or more documents, applications, or services, 2532.

In some implementations, one or more of the computing and communications devices 2300, 2410, 2420, 2510, 2520, 2530 may communicate with one or more other computing and communications devices 2300, 2410, 2420, 2510, 2520, 2530, or with one or more of the networks 2400, 2500, via a virtual private network. For example, the second computing and communications device 2410 is shown as communicating with the third network 2500, and therefore with one or more of the computing and communications devices 2510, 2520, 2530 in the third network 2500, via a virtual private network 2700, which is shown using a broken line to indicate that the virtual private network 2700 uses the first network 2100, the third communications link 2620, and the fourth communications link 2630.

In some implementations, two or more of the computing and communications devices 2300, 2410, 2420, 2510, 2520, 2530 may be in a distributed, or clustered, configuration. For example, the third computing and communications device 2510, the fourth computing and communications device 2520, and the fifth computing and communications device 2520 may, respectively, be elements, or nodes, in a distributed configuration.

In some implementations, one or more of the computing and communications devices 2300, 2410, 2420, 2510, 2520, 2530 may be a virtual device. For example, the third computing and communications device 2510, the fourth computing and communications device 2520, and the fifth computing and communications device 2520 may, respectively, be virtual devices operating on shared physical resources.

In some implementations, as shown in connection with the computing and communication device 2300, one or more of the computing and communications devices 2300, 2410, 2420, 2510, 2520, 2530 may include one or more SIM components 2320. A SIM component 2320 may be implemented as either a traditional SIM card or an embedded SIM (eSIM), with each providing functionality for securely storing subscription and identity information essential for accessing cellular networks. When implemented as a traditional SIM card, the SIM component 2320 may conform to various standardized form factors, including full-size SIM (1FF), mini-SIM (2FF), micro-SIM (3FF), or nano-SIM (4FF). These physical SIM cards store user-specific data, such as the International Mobile Subscriber Identity (IMSI), authentication keys, subscription details, and phone numbers, enabling cellular connectivity. Traditional SIM cards are often replaceable, allowing users to switch network providers or devices as needed.

Alternatively, the SIM component 2320 may be implemented as an eSIM, which is a non-removable module conforming to the embedded Universal Integrated Circuit Card (eUICC) standard. Unlike traditional SIM cards, eSIMs enable advanced features such as Remote SIM Provisioning (RSP), which allows network profiles to be updated, activated, or deactivated over-the-air without requiring physical replacement. An eSIM may store multiple network profiles simultaneously, enabling devices to connect to multiple operators or seamlessly switch between networks as required. An eSIM component may also be implemented in compact, solderable form factors such as MFF2, making it suitable for integration into rugged, space-constrained devices such as IoT sensors, connected vehicles, and industrial equipment. Furthermore, eSIMs utilize secure cryptographic protocols to protect user data, including IMSI and authentication keys, from unauthorized access.

In some implementations, the SIM component 2320, whether implemented as a traditional SIM card or eSIM, may support a wide range of applications. For example, in consumer devices such as smartphones, tablets, and laptops, the SIM component 2320 may enable cellular connectivity for voice, text, and data communication. In machine-to-machine (M2M) communication applications, eSIMs are widely deployed in IoT devices such as smart meters, security systems, and environmental sensors, enabling autonomous data exchange. In automotive systems, eSIMs may be used in connected vehicles to support over-the-air (OTA) software updates, real-time navigation, vehicle diagnostics, and emergency communication services. Similarly, drones and autonomous robots may use SIM components to maintain reliable connectivity for remote control, telemetry, and data exchange. In industrial IoT (IIoT) deployments, eSIMs are integrated into devices such as sensors, actuators, and programmable logic controllers (PLCs) to enable monitoring and control of industrial processes. Additional applications include wearable technology, such as smartwatches and fitness trackers, which use SIM components to facilitate cellular connectivity without relying on tethering to smartphones, and healthcare devices, such as telemedicine platforms and remote patient monitoring systems, which use eSIMs to enable real-time data exchange and emergency alerts.

SIM networking refers to the use of SIM technology, which enables computing and communication devices to authenticate and connect to mobile network operators (MNOs). SIM technology may include traditional SIM technology or eSIM technology. Traditional SIM technology typically employs a removable SIM card that stores essential information, including the International Mobile Subscriber Identity (IMSI), authentication keys, and subscription details, allowing the device to access the MNO's network. Upon insertion into a compatible device, the SIM card facilitates communication with the MNO's infrastructure, where the network verifies the device's credentials, assigns resources such as an IP address, and configures network parameters like the Access Point Name (APN). Data traffic from the device is then routed through the MNO's infrastructure to access internet services.

eSIM networking refers to the use of eSIM technology, which integrates a programmable subscriber identification module directly into the computing or communication device. Unlike traditional SIM cards, eSIMs conform to the eUICC standard and are soldered onto the device's circuit board, making them non-removable. This architecture enables advanced features, including remote provisioning, where users can download and activate carrier profiles over-the-air without the need to physically replace SIM cards. eSIM networking simplifies subscription management by allowing users to switch between mobile carriers or add new subscriptions remotely. In eSIM networking, when a carrier profile is downloaded and activated, the eSIM securely stores the IMSI, authentication keys, and network-specific settings. The device then communicates with the MNO's infrastructure to authenticate the stored credentials. Following authentication, the MNO assigns necessary network resources, including an IP address, and applies appropriate network settings, such as APN configurations. As with traditional SIM technology, the data traffic is routed through the MNO's infrastructure before reaching the internet. Additionally, eSIM networking supports multi-profile management, allowing a single eSIM to store multiple carrier profiles. This capability enables the device to operate across multiple MNOs, dynamically switching between them as required.

In some implementations, SIM networking may be used for communication not destined for the internet. For example, SIM networking may be used in enterprise environments, home networking environments, and/or Internet-of-Things systems, among other examples.

Figure 3:
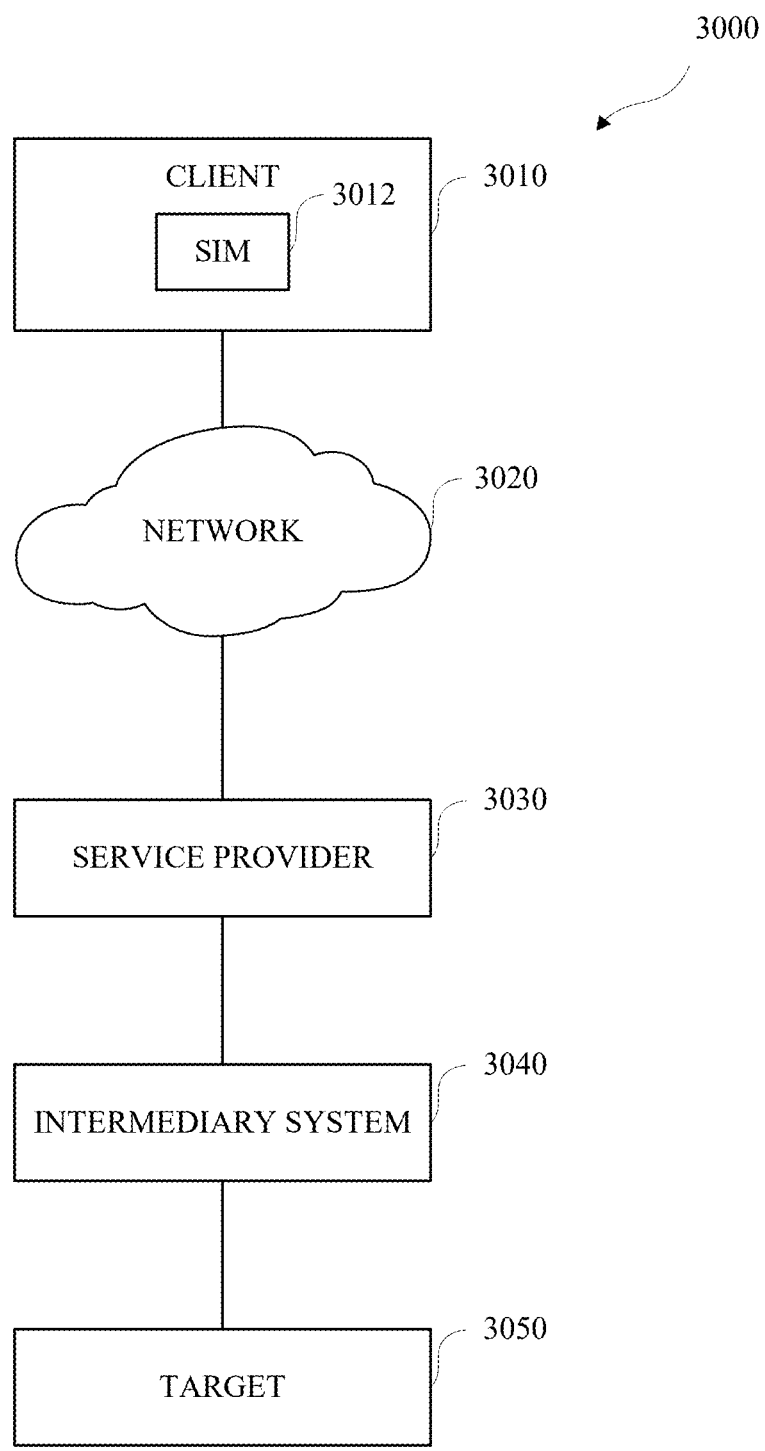
FIG. 3 is a block diagram of a system in which a secure subscriber identification module (SIM) networking service can be implemented.

FIG. 3 is a block diagram of a system 3000 in which a secure SIM networking service can be implemented. The system 3000 includes a client 3010, a network 3020, a service provider 3030, an intermediary system 3040, and a target 3050, which are communicatively connected.

Each of the client 3010, the network 3020, the service provider 3030, the intermediary system 3040, and the target 3050 may be generically referred to as a system component. A system component refers to one or more devices and/or applications. Where a system component is or refers to a device, the system component can be, be similar to, include, or be included in a computing system, which can include one or more computing devices (e.g., one or more of the computing device 1000 of FIG. 1). Where a system component is or refers to an application, the system component can be, be similar to, include, or be included in an instance of software running on a device (e.g., a computing device). In some implementations, a system component can be implemented as a single physical unit or as a combination of physical units. In some implementations, a single physical unit can include multiple components.

The client 3010 may be any computing device capable of wireless communication, such as a smartphone, tablet, laptop, Internet-of-Things (IoT) device, or wearable technology. The client 3010 may includes an SIM component 3012. As described herein, the SIM component 3012 may be a removable SIM component or an embedded component that stores and manages multiple network operator profiles, allowing the client 3010 to connect to different mobile networks. For example, the client 3010 could be a smartphone or a smartwatch with an SIM component 3012 that enables cellular connectivity for making calls and accessing data services. In some implementations, the client 3010 may include multiple SIM components or a hybrid system combining both eSIM and traditional physical SIM capabilities.

The network 3020 may include a communication infrastructure that facilitates data transmission between the client 3010 and the service provider 3030. This network may encompass various technologies such as cellular networks (e.g., 4G, 5G, 6G, etc.), Wi-Fi networks, or other wireless communication protocols. In some implementations, the network 3020 may include multiple interconnected networks, potentially spanning different geographical regions or operated by different entities. For instance, the network 3020 could comprise a combination of a local Wi-Fi network and a global cellular network, allowing seamless transition between connectivity options.

The network 3020 may include one or more radio access technologies (RATs) that enable wireless communication between the client 3010 and the service provider 3030. These RATs may include, but are not limited to, Global System for Mobile Communications (GSM), Universal Mobile Telecommunications System (UMTS), Long-Term Evolution (LTE), 5G New Radio (NR), Wi-Fi, Bluetooth, Zigbee, or other wireless communication standards. In some implementations, the network 3020 may support multiple RATs simultaneously, allowing devices to switch between different technologies based on availability, signal strength, or specific communication requirements.

The network 3020 may also incorporate various network elements and infrastructure components to support data transmission and routing. These may include base stations, Node Bs, eNodeBs, gNodeBs, access points, routers, switches, and gateways. In some cases, the network 3020 may utilize software-defined networking (SDN) and network function virtualization (NFV) technologies to provide flexible and scalable network management. The network 3020 may also implement various protocols and technologies to enhance security, quality of service, and network efficiency, such as Internet Protocol Security (IPSec), Transport Layer Security (TLS), Multi-Protocol Label Switching (MPLS), or Software-Defined Wide Area Network (SD-WAN) capabilities.

The service provider 3030 is typically an MNO or mobile virtual network operator (MVNO) that provides cellular connectivity services to the client 3010. The service provider 3030 manages user authentication, assigns network resources, and routes traffic between the client 3010 and the broader internet. In the context of eSIM technology, the service provider 3030 may offer remote SIM provisioning services, allowing users to download and activate new cellular plans without physical SIM cards. Some implementations may include multiple service providers working in conjunction to offer global or specialized connectivity services. Throughout this disclosure, the term "service provider" may refer to one or more computing devices associated with an entity that provides cellular connectivity services. A service provider, therefore, may include one or more servers, one or more networks, or other devices (or virtual machines) used to provide cellular services, among other examples.

The intermediary system 3040 may serve as a secure gateway that enhances the privacy and security of SIM-based communications. The intermediary system 3040 may include multiple sub-components, including a security service platform, a PoP system including one or more PoPs, and/or a VPN system, which may include any number of VPNs. This system addresses the technical problem of limited security and privacy controls in traditional SIM setups by providing a flexible, user-controlled security layer.

The intermediary system 3040 may receive requests originating from the client 3010 and generate secure requests based on an SIM security service. This process involves analyzing metadata associated with the request and the client, applying security policies, and potentially rerouting the traffic through secure channels. For example, when a user attempts to access a website, the intermediary system 3040 may check the request against known malicious domains, apply encryption, and route the traffic through a VPN server in a user-specified location such as, for example, a country, a state, a city, or other region. The intermediary system 3040 may also implement DNS-based threat protection to proactively block access to potentially harmful websites. In some implementations, the system may provide users with options to customize their privacy settings, such as selecting a preferred exit point for their traffic or enabling enhanced encryption for sensitive communications. By combining these security measures with the flexibility of SIM technology, the intermediary system 3040 may create a robust and adaptable secure networking service that addresses the evolving needs of wireless devices.

The target 3050 represents a destination for communications originating from the client 3010. The target 3050 may include a website, an application server, or any other network resource. The target 3050 receives the secure request generated by the intermediary system 3040, which may appear to originate from a different location or have additional security measures applied. For instance, if a user in the United States configures their SIM security service to route traffic through Germany, the target 3050 would perceive the request as coming from a German IP address.

In operation, the system 3000 provides a secure SIM networking service that enhances user privacy and security. When the client 3010 initiates a request, it is first sent through the network 3020 to the service provider 3030. The service provider 3030 then forwards the request, along with relevant metadata, to the intermediary system 3040. This metadata may include information such as the client's MSISDN, an ICCID, or location data. The intermediary system 3040 may process this information, combining it with user preferences and security policies defined by the SIM security service. The intermediary system 3040 may generate a secure request that may involve rerouting the traffic, applying encryption, or implementing other security measures. The secure request is then forwarded to the target 3050, completing the communication path.

Figure 4:
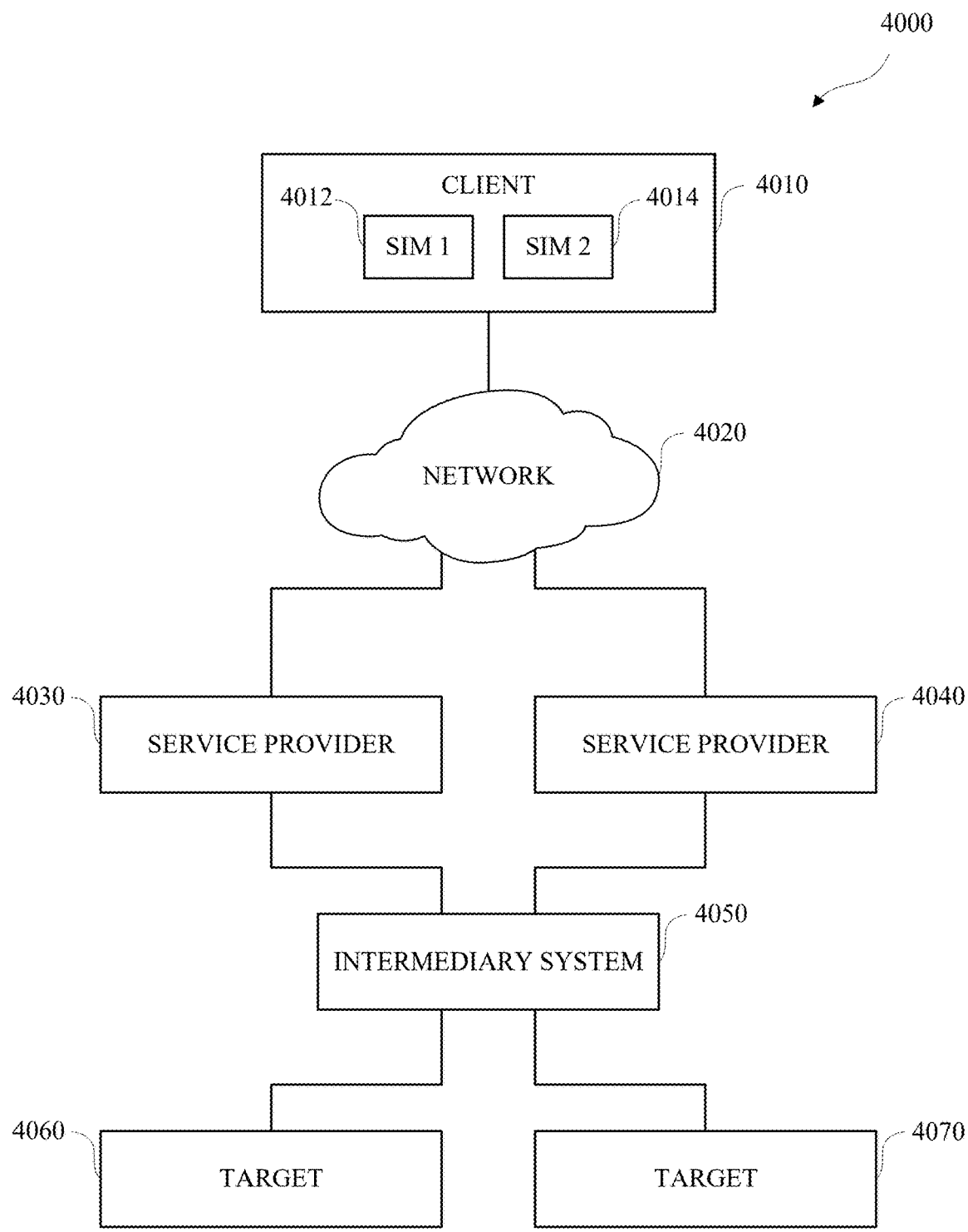
FIG. 4 is a block diagram of a system in which a secure SIM networking service can be implemented.

FIG. 4 is a block diagram of a system 4000 in which a secure SIM networking service can be implemented. The system 4000 includes a client 4010, a network 4020, a service provider 4030, a service provider 4040, an intermediary system 4050, a target 4060, and a target 4070, which are communicatively connected.

Each of the client 4010, the network 4020, the service provider 4030, the service provider 4040, the intermediary system 4050, the target 4060, and the target 4070 may be generically referred to as a system component. A system component refers to one or more devices and/or applications. Where a system component is or refers to a device, the system component can be, be similar to, include, or be included in a computing system, which can include one or more computing devices (e.g., one or more of the computing device 1000 of FIG. 1). Where a system component is or refers to an application, the system component can be, be similar to, include, or be included in an instance of software running on a device (e.g., a computing device). In some implementations, a system component can be implemented as a single physical unit or as a combination of physical units. In some implementations, a single physical unit can include multiple components.

The client 4010 includes a first SIM 4012 and a second SIM 4014, allowing the client 4010 to potentially connect to multiple service providers. The client 4010 may be any computing device capable of wireless communication, such as a smartphone, tablet, laptop, IoT device, or wearable technology. For example, the client 4010 could be a smartwatch with two SIMs, one for cellular connectivity and another for specialized IoT applications. In some implementations, the client 4010 may be a connected vehicle with multiple SIMs for different functions like navigation, entertainment, and vehicle diagnostics. In some implementations, the client 4010 may be a smart home hub managing various connected devices, each with its own SIM for different service providers or network types. In some implementations, the client 4010 may be a portable medical device with separate SIMs for transmitting patient data and receiving software updates. Although shown with two SIMs 4012 and 4014, the client 4010 may include any number of SIMs. In some implementations, the client 4010 may include a combination of eSIMs and traditional physical SIM cards to provide even greater flexibility in network connectivity options.

The network 4020 facilitates communication between the various components of the system 4000. The network 4020 may encompass a wide range of communication technologies, including cellular networks (e.g., 4G, 5G), Wi-Fi, Bluetooth, or other wireless protocols. In some implementations, the network 4020 may include multiple interconnected networks spanning different geographical regions or operated by different entities. For instance, the network 4020 could comprise a combination of a local Wi-Fi network, a national cellular network, and a global satellite communication system, allowing for seamless connectivity across various environments and use cases. The first service provider 4030 and the second service provider 4040 provide two different cellular connectivity services to the client 4010. The first service provider 4030 and the second service provider 4040 may manage user authentication, assign network resources, and route traffic between the client 4010 and the broader internet.

The intermediary system 4050 may serve as a secure gateway that enhances the privacy and security of SIM-based communications. The intermediary system 4050 may be similar to the intermediary system 3040 of FIG. 3. The intermediary system 4050 receives requests originating from the client 4010 through either of the service providers (4030 or 4040) and generates secure requests based on an SIM security service. This process may involve analyzing metadata associated with the request and the client, applying security policies, and potentially rerouting the traffic through secure channels. For instance, when a user attempts to access a website, the intermediary system 4050 may check the request against known malicious domains, apply encryption, and route the traffic through a VPN server in a user-specified location such as, for example, a country, a state, a city, or other region. In some implementations, the intermediary system 4050 may incorporate machine learning algorithms to dynamically adjust security measures based on real-time threat intelligence.

The first target 4060 and the second target 4070 represent different destinations for communications originating from the client 4010. These targets may include websites, application servers, or other network resources. The first target 4060 and the second target 4070 receive secure requests generated by the intermediary system 4050, which may appear to originate from different locations or have additional security measures applied.

Figure 5A:
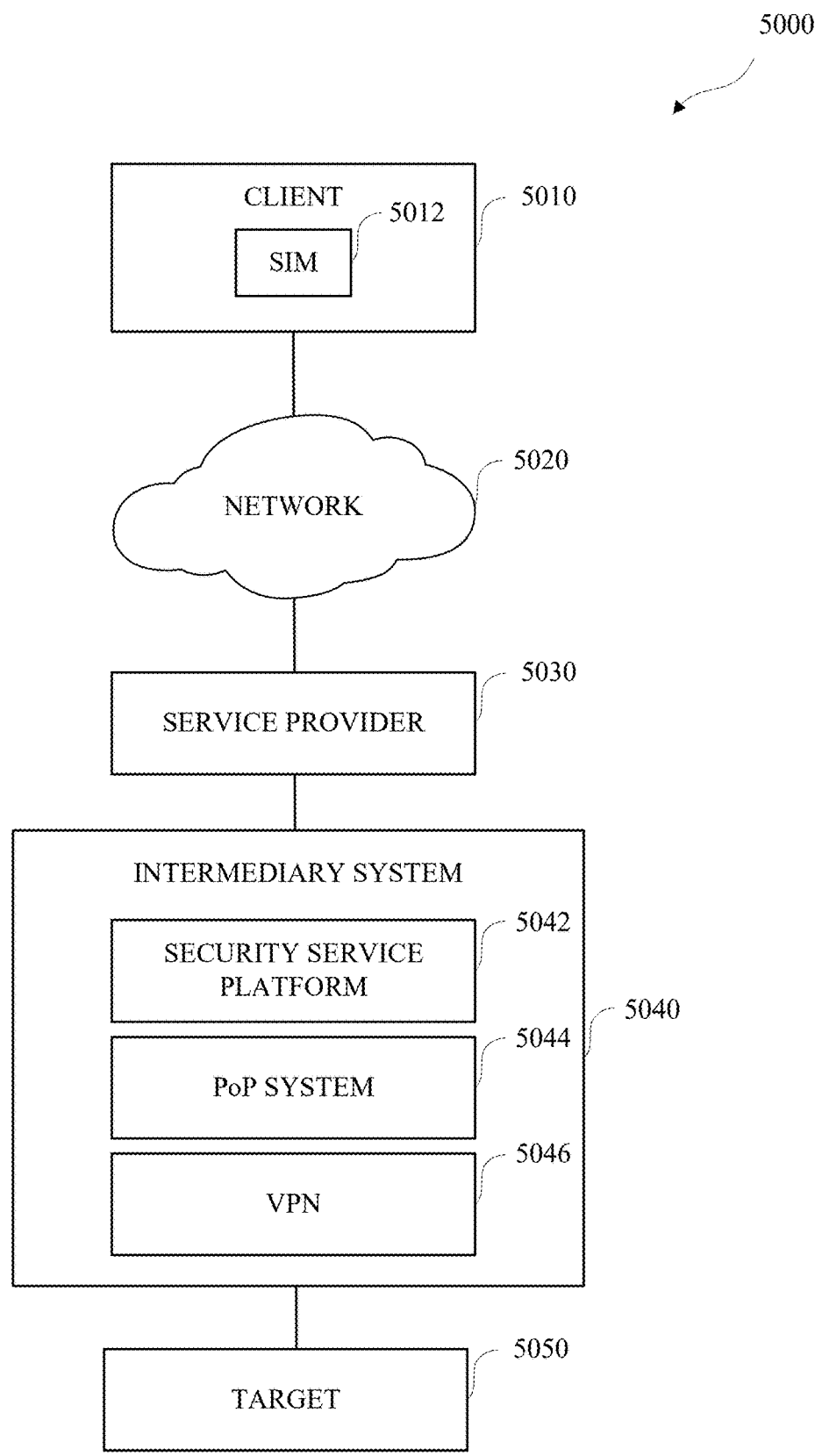
FIGS. 5A and 5B are block diagrams of systems in which a secure SIM networking service can be implemented.

FIG. 5A is a block diagram of a system 5000 in which a secure SIM networking service can be implemented. The system 5000 includes a client 5010, a network 5020, a service provider 5030, an intermediary system 5040, and a target 5050, which are communicatively connected.

Each of the client 5010, the network 5020, the service provider 5030, the intermediary system 5040, and the target 5050 may be generically referred to as a system component. A system component refers to one or more devices and/or applications. Where a system component is or refers to a device, the system component can be, be similar to, include, or be included in a computing system, which can include one or more computing devices (e.g., one or more of the computing device 1000 of FIG. 1). Where a system component is or refers to an application, the system component can be, be similar to, include, or be included in an instance of software running on a device (e.g., a computing device). In some implementations, a system component can be implemented as a single physical unit or as a combination of physical units. In some implementations, a single physical unit can include multiple components.

The client 5010 may be similar to the client 3010 or 4010 described above, potentially including an SIM 5012 that allows the device to connect to mobile networks without a physical SIM card. The client 5010 may be any computing device capable of wireless communication, such as a smartphone, tablet, laptop, IoT device, or wearable technology. The network 5020 may be similar to the networks 3020 or 4020 described previously, facilitating communication between the client 5010 and the service provider 5030. The network 5020 may encompass various communication technologies, including cellular networks, Wi-Fi, or other wireless protocols, and may include multiple interconnected networks spanning different geographical regions. The service provider 5030 may be similar to the service providers 3030, 4030, or 4040 mentioned earlier. It may be responsible for providing network services to the client 5010, managing user authentication, assigning network resources, and routing traffic between the client 5010 and the broader internet. In some implementations, the service provider 5030 may offer remote SIM provisioning services for SIM-enabled devices.

The intermediary system 5040 may include a security service platform 5042, a PoP (Point of Presence) system 5044, and a VPN (Virtual Private Network) 5046.

The security service platform 5042 may manage security features and services for the system 5000. It may include components such as an API for receiving and processing requests, a data store for managing user preferences and security policies, and a service engine for coordinating security operations. In some implementations, the security service platform 5042 may incorporate machine learning algorithms to dynamically adjust security measures based on real-time threat intelligence.

The security service platform 5042 may perform various advanced networking functions to enhance the security and efficiency of SIM-based communications. One such function may involve the implementation of tunneling protocols. Tunneling refers to the process of encapsulating one network protocol within another, allowing data to be transmitted securely across incompatible networks or through untrusted network infrastructure. The security service platform 5042 may support multiple tunneling protocols, such as Generic Routing Encapsulation (GRE), Network Virtualization using Generic Routing Encapsulation (NVGRE), Generic Network Virtualization Encapsulation (GENEVE), Virtual Extensible LAN (VXLAN), and Internet Protocol Security (IPSec). For example, the security service platform 5042 may use VXLAN to create isolated network segments for different clients or applications, enhancing security and network performance. In some cases, IPSec tunneling may be employed to establish encrypted communication channels between the client 5010 and the target 5050, ensuring data confidentiality and integrity.

In addition to these traditional tunneling protocols, the security service platform 5042 may support modern tunneling protocols such as OpenVPN, WireGuard, Transport Layer Security (TLS), HTTP proxy, and HTTPS proxy. OpenVPN provides a highly secure and flexible solution for creating virtual private networks (VPNs) by leveraging SSL/TLS encryption to safeguard data traffic. WireGuard, a lightweight and efficient VPN protocol, offers enhanced performance and simplified configuration compared to traditional VPN solutions while maintaining strong cryptographic guarantees. TLS tunneling may be used to secure application-layer communications, providing encryption and data integrity for protocols such as HTTP or custom applications. HTTP proxy and HTTPS proxy protocols allow the platform to route traffic through intermediaries, enabling additional layers of anonymity and security by obfuscating the client's origin and encrypting transmitted data when HTTPS is used.

By supporting this comprehensive suite of tunneling protocols, the security service platform 5042 provides a versatile and secure foundation for SIM-based communications. This flexibility may allow for the creation of isolated, encrypted, and efficient communication channels suitable for a wide range of applications, including consumer devices, enterprise systems, IoT networks, and industrial deployments. The combination of traditional and modern tunneling technologies may facilitate compatibility with existing infrastructure while addressing the evolving security and performance requirements of next-generation communication systems.

The security service platform 5042 may also incorporate Multiprotocol Label Switching (MPLS) functionality. MPLS is a routing technique that uses short path labels instead of complex network addresses to direct data from one network node to the next. This may allow the security service platform 5042 to create efficient and flexible routing paths for SIM traffic, potentially improving network performance and enabling advanced traffic engineering capabilities. In some implementations, the security service platform 5042 may use MPLS to establish VPNs for secure client communications, or to prioritize certain types of traffic based on quality of service (QOS) requirements.

In some implementations, the security service platform 5042 may offer options for dedicated leased lines or wave/dark fiber connections. A dedicated leased line is a private, fixed-bandwidth data connection between two points, which may provide guaranteed bandwidth and low latency. Wave or dark fiber refers to the leasing of unlit optical fiber, allowing clients to implement their own networking equipment and protocols. These options may be particularly useful for enterprise clients or applications with stringent security or performance requirements. For instance, the security service platform 5042 may facilitate the establishment of a dedicated leased line between a client's data center and a specific PoP, facilitating consistent and secure connectivity for SIM-based applications.

Some implementations may incorporate machine learning within the security service platform 5042 that may be configured to enhance adaptive and proactive security measures. Machine learning may be configured to analyze network traffic data in real-time, identifying patterns and anomalies that could indicate potential security threats. For example, machine learning models may be trained to detect unusual traffic patterns or behaviors associated with specific SIMs, potentially indicating a compromised device or attempted network intrusion. The security service platform 5042 may use these insights to dynamically adjust firewall rules, update routing policies, or trigger additional security measures such as multi-factor authentication. In some implementations, machine learning algorithms may also be used to optimize network performance, predicting traffic patterns and preemptively adjusting network resources to ensure optimal routing and load balancing for SIM-based communications.

The PoP system 5044 may be configured to facilitate routing and traffic management within the intermediary system 5040. The PoP system 5044 may include multiple geographically distributed points of presence, each capable of processing and forwarding network traffic. The PoP system 5044 may enable efficient routing of client requests based on factors such as geographic proximity, network conditions, and user preferences. In some implementations, the PoP system 5044 may employ software-defined networking (SDN) techniques for dynamic traffic optimization. Some implementations could incorporate edge computing capabilities at each PoP to provide low-latency services closer to end-users.

The VPN 5046 provides secure, encrypted connections for data transmission within the intermediary system 5040. The VPN 5046 may include multiple VPN servers distributed across various locations, allowing users to choose their preferred exit point for internet traffic. The VPN 5046 enhances privacy by masking the client's true IP address and encrypting data in transit. Some implementations of the VPN 5046 may support advanced features such as split tunneling or multi-hop connections for additional security.

The target 5050 represents the destination for client requests, such as websites, application servers, or other network resources. It receives the secure request generated by the intermediary system 5040, which may appear to originate from a different location or have additional security measures applied. In operation, the system 5000 provides a secure SIM networking service that enhances user privacy and security. When the client 5010 initiates a request, it is first sent through the network 5020 to the service provider 5030. The service provider 5030 then forwards the request, along with relevant metadata, to the intermediary system 5040. This metadata may include information such as the client's MSISDN, ICCID, IP address, or location data.

Within the intermediary system 5040, the security service platform 5042 processes the incoming request and metadata. It may combine this information with user preferences and security policies defined by the SIM security service. For example, a user might have configured their service to always use a VPN when accessing financial websites or to apply enhanced encryption for all communications while traveling abroad.

The PoP system 5044 may be configured to determine the appropriate routing for the request based on the processed information. This could involve selecting the most efficient path through the network or choosing a specific exit point based on the user's privacy preferences. For instance, a journalist working in a country with strict internet censorship might configure their SIM security service to always route traffic through a PoP in a country with strong press freedoms.

If VPN functionality is indicated, the request is forwarded to the VPN 5046 for secure transmission. The VPN 5046 encrypts the data and routes it through the chosen exit point, effectively masking the client's true location and enhancing privacy. This could be particularly useful for businesses conducting sensitive international operations or for individuals accessing geo-restricted content.

The processed and secured request is sent to the target 5050, completing the communication path. Throughout this process, the intermediary system 5040 may apply a wide range of additional security measures to ensure the integrity, confidentiality, and availability of the communication. For instance, DNS-based threat protection may be employed to block access to known malicious domains, preventing devices from inadvertently communicating with harmful entities. Data loss prevention (DLP) techniques may also be implemented to safeguard sensitive information by detecting and blocking unauthorized data transmissions based on predefined policies.

In some implementations, the intermediary system 5040 may incorporate other network protection mechanisms, including IP-based firewalls and port blocking. An IP-based firewall may be configured to restrict traffic based on source and destination IP addresses, ensuring that only authorized communications are allowed through the network. Port blocking may be used to prevent unauthorized access to specific network services or applications by closing unused or vulnerable ports.

In some implementations, the intermediary system 5040 may also utilize Deep Packet Inspection (DPI) to analyze packet payloads in real time, enabling the enforcement of DPI-based rules to detect and mitigate advanced threats such as malware, intrusion attempts, or unauthorized data exfiltration. Web Application Firewalls (WAF) may be applied to protect against application-layer attacks, such as SQL injection, cross-site scripting (XSS), and other vulnerabilities targeting web-based systems. By inspecting and filtering incoming and outgoing web traffic, a WAF may help to safeguard sensitive applications and services hosted on the target 5050.

Furthermore, the intermediary system 5040 may implement traffic pattern-based protections to identify and respond to anomalous or malicious behaviors. By analyzing traffic flows for unusual patterns, such as volumetric spikes or irregular access attempts, the intermediary system 5040 can detect distributed denial-of-service (DDOS) attacks, botnet activity, or unauthorized access attempts and take appropriate countermeasures.

In various implementations, these protections may enhance the security of the communication path by addressing a wide range of network-level and application-level threats. This comprehensive approach may facilitate secure data transfer to the target 5050 as well as active monitoring and mitigating of risks throughout the process, providing robust and adaptive defense mechanisms suitable for diverse deployment scenarios.

The system 5000 can be implemented in various ways to suit different use cases and requirements. For example, in a corporate setting, the intermediary system 5040 could be configured to enforce company-wide security policies for all SIM-enabled devices. This might include automatically routing all traffic through corporate VPN servers and/or to access internal corporate networks, applying strict access controls, and logging network activities for compliance purposes.

In an IoT scenario, the system 5000 could be adapted to provide secure connectivity for large-scale sensor networks. The SIM 5012 in each sensor could be provisioned with a unique security profile, allowing for granular control over data access and transmission. The intermediary system 5040 could then aggregate and anonymize data from multiple sensors before forwarding it to the target 5050, enhancing both security and privacy.

For consumer applications, the system 5000 may provide a user-friendly interface that allows individuals to customize their privacy and connectivity settings based on their specific needs. For example, users may create profiles tailored to different situations, such as a "travel mode" that automatically routes all traffic through a VPN and enables additional security features when connecting to public Wi-Fi networks.

In some implementations, the system 5000 may include functionality to route all internet traffic through a designated home or office router. This configuration may enable users to securely access internal systems, such as corporate databases or private home servers, while maintaining the appearance of originating traffic from the home or office IP address. By directing traffic through the home or office network, users may benefit from existing security policies, such as firewalls, port blocking, and intrusion detection systems, which are typically implemented at these trusted locations.

In some implementations, the system 5000 may allow users to route all outgoing internet traffic through the home or office IP address to maintain a consistent network identity. This can be particularly beneficial for applications requiring geographical consistency or for accessing location-restricted content. The routing functionality may be seamlessly integrated into the system's privacy settings, enabling users to toggle this feature on or off or to associate it with specific profiles, such as "work-from-home" or "remote access" modes.

By combining the ability to route traffic through a VPN for public networks with options to channel traffic through a home or office IP address, some implementations of the system 5000 may provide a versatile and secure solution that adapts to the varying needs of users, whether they are traveling, working remotely, or accessing sensitive internal systems. This flexibility may facilitate robust privacy and security while maintaining user convenience.

Figure 5B:
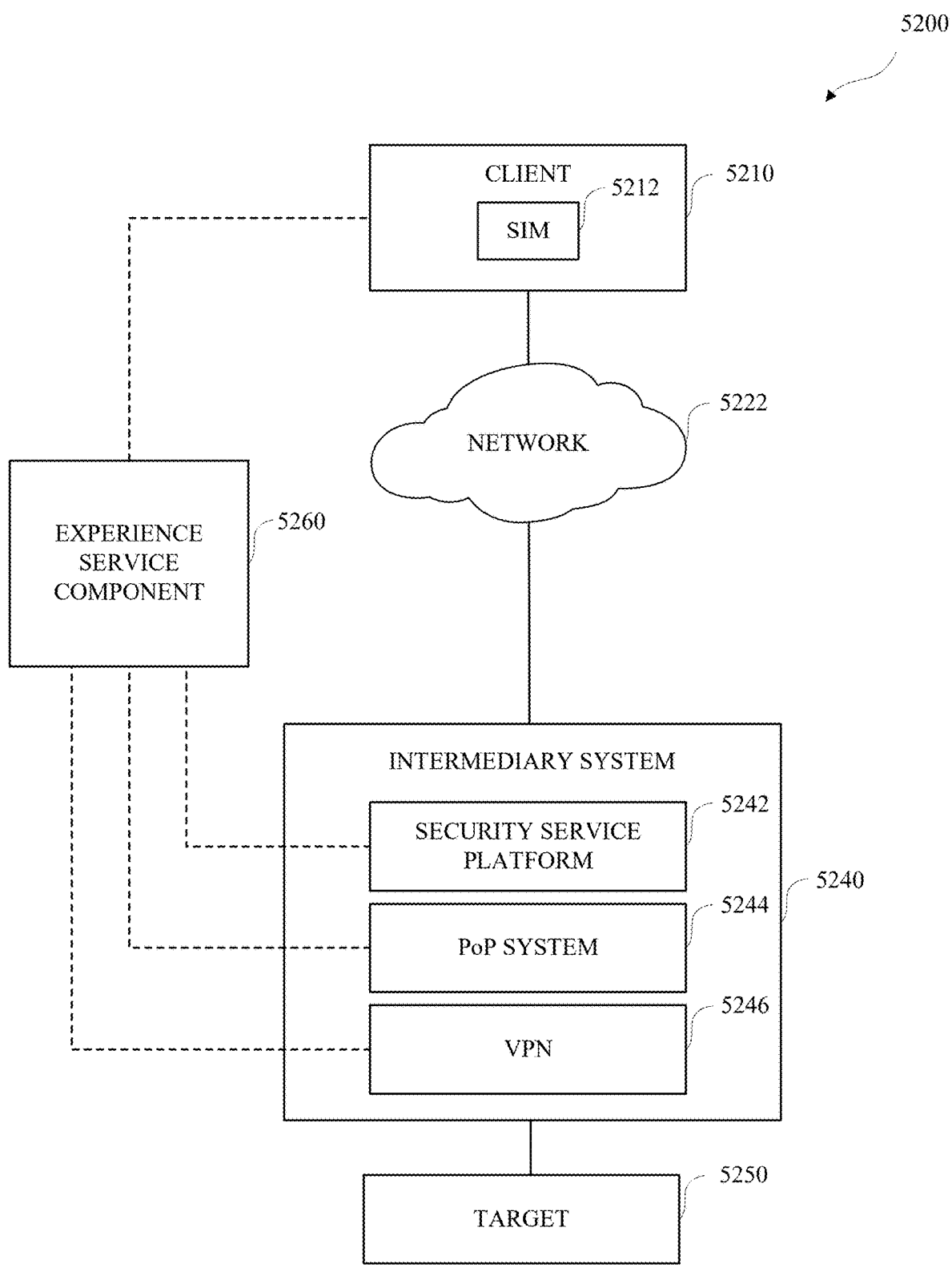

FIG. 5B illustrates a block diagram of a system 5200 for secure communication, which shares some similarities with the system 5000 depicted in FIG. 5A but introduces some differences. The system 5200 comprises a client 5210, a network 5222, an intermediary system 5240, a target 5250, and an experience service component 5260.

Similar to FIG. 5A, the client 5210 includes a SIM component 5212, which may be an eSIM or a physical SIM card. The client 5210 is connected to the network 5222, which facilitates communication between the components of the system 5200.

A difference in FIG. 5B is the absence of a separate service provider component. Instead, the network 5222 connects the client 5210 directly to the intermediary system 5240. This configuration may suggest a more streamlined communication path or indicate that the service provider functionality may be integrated into the network 5222 or the intermediary system 5240.

The intermediary system 5240, positioned between the network 5222 and the target 5250, retains the three main components seen in FIG. 5A: a security service platform 5242, a PoP system 5244, and a VPN 5246. These components may function similarly to their counterparts in FIG. 5A, implementing security measures, managing traffic routing, and providing secure, encrypted connections respectively.

An addition in FIG. 5B is the experience service component 5260. This component is shown connected to both the client 5210 and the intermediary system 5240 via dashed lines, suggesting a potential interface for user interaction or service configuration. The experience service component 5260 may provide users with a means to customize their security settings, view performance metrics, or interact with the secure communication service in other ways.

In operation, the system 5200 may allow for communication from the client 5210 to flow through the network 5222 and intermediary system 5240 before reaching the target 5250. The intermediary system 5240 may apply security measures or other processing to the communication as it passes through, utilizing its security service platform 5242, PoP system 5244, and VPN 5246 components.

The addition of the experience service component 5260 may enhance the user experience by providing greater visibility into the secure communication process and allowing for more user control. For example, users may be able to view real-time statistics about their secure connections, adjust security settings on-the-fly, or receive notifications about potential security threats that have been mitigated.

This configuration may offer a more user-centric approach to secure SIM-based communications, potentially increasing user engagement and allowing for more personalized security solutions. The direct connection between the experience service component 5260 and the intermediary system 5240 may also facilitate more efficient updates to security policies or user preferences, enhancing the system's ability to adapt to changing user needs or emerging security threats.

Figure 6:
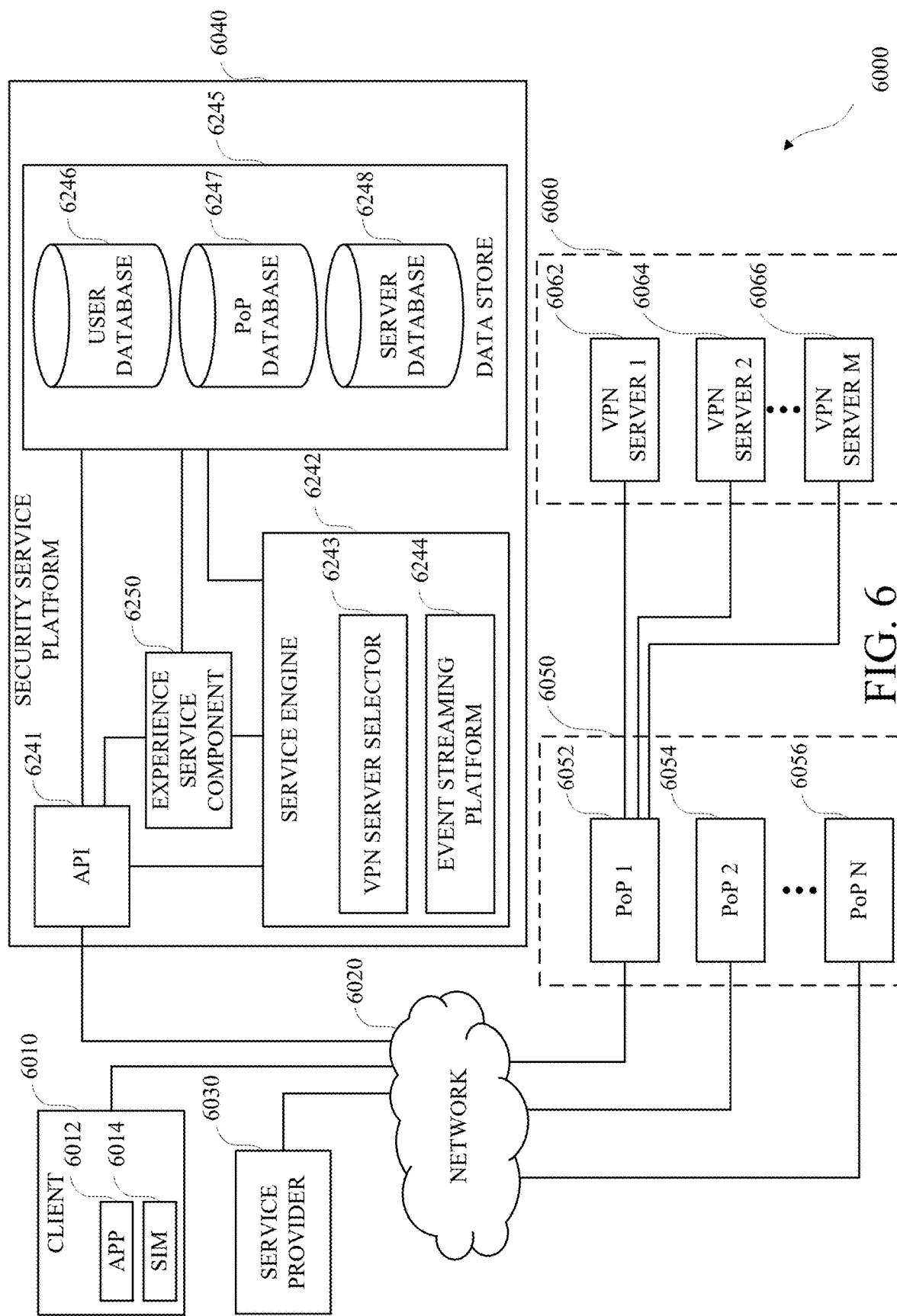
FIG. 6 is a block diagram of a system in which a secure SIM networking service can be implemented.

FIG. 6 is a block diagram of a system 6000 in which a secure SIM networking service can be implemented. The system 6000 includes a client 6010, a network 6020, a service provider 6030, a security service platform 6040, a PoP system 6050, and a VPN 6060, which are communicatively connected. The security service platform 6040, the PoP system 6050, and/or the VPN 6060 may be, be similar to, include, or be included in, an intermediary system such as, for example, the intermediary system 5040 shown in FIG. 5, the intermediary system 4050 shown in FIG. 4, or the intermediary system 3040 shown in FIG. 3.

Each of the client 6010, the network 6020, the service provider 6030, the security service platform 6040, the PoP system 6050, and the VPN 6060 may be generically referred to as a system component. A system component refers to one or more devices and/or applications. Where a system component is or refers to a device, the system component can be, be similar to, include, or be included in a computing system, which can include one or more computing devices (e.g., one or more of the computing device 1000 of FIG. 1). Where a system component is or refers to an application, the system component can be, be similar to, include, or be included in an instance of software running on a device (e.g., a computing device). In some implementations, a system component can be implemented as a single physical unit or as a combination of physical units. In some implementations, a single physical unit can include multiple components.

The client 6010, network 6020, service provider 6030, security service platform 6040, PoP system 6050, and VPN 6060 may be similar to corresponding components described in previous figures. The client 6010 may include an application 6012 and a SIM 6014. The application 6012 may be any type of mobile application. The application 6012 may be configured to facilitate communication between the client 6010 and one or more other components of the system 6000. The SIM 6014 may include a removable SIM component or an eSIM component. The network 6020 may facilitate communication between the client 6010 and the service provider 6030. The service provider 6030 may be a mobile network operator or mobile virtual network operator that provides cellular connectivity services to the client 6010. In some aspects, the service provider 6030 may interface with the security service platform 6040 to enable enhanced security features for SIM-based communications.

The security service platform 6040 may be configured to manage and implement a secure SIM networking service. The security service platform 6040 may include several components such as an API 6241; a service engine 6242, which may include a VPN server selector 6243 and an event streaming platform 6244; and a data store 6245, which may include a user database 6246, a PoP database 6247, and a server database 6248.

The security service platform 6040 may be configured to implement security policies, process incoming requests, and coordinate the actions of other components of the security service platform 6040. The security service platform 6040 may include features such as threat detection, encryption management, and access control mechanisms to ensure the overall security of the SIM networking service. In some implementations, the security service platform 6040 may incorporate machine learning algorithms to dynamically adjust security measures based on real-time threat intelligence. The security service platform 6040 may also implement various network protocols and technologies to enhance security and network efficiency, such as tunneling protocols, MPLS functionality, or support for dedicated leased lines. In some aspects, the security service platform 6040 may offer flexible routing options, allowing users to specify exit points for their traffic to enhance privacy. The security service platform 6040 may also include DNS-based threat protection to proactively block access to known malicious domains. Additionally, the security service platform 6040 may provide options for users to customize their privacy settings, such as creating profiles for different situations or enabling enhanced encryption for sensitive communications.

The data store 6245 within the security service platform 6040 may include databases configured to facilitate the operation of the secure SIM networking service. The data store 6245 may include a user database 6246, which may store user profiles, preferences, and authentication information. The user database 6246 may contain data such as usernames, passwords, account types, subscription levels, billing information, device identifiers, usage history, and personalized settings. In some aspects, the user database 6246 may also store biometric data for multi-factor authentication, such as fingerprint or facial recognition data. The user database 6246 may be populated with information provided during account creation, gathered from user interactions, or obtained from third-party identity providers. The user database 6246 may be regularly updated to reflect changes in user preferences, device usage patterns, or account status.

The data store 6245 may include a PoP database 6247, which may maintain information about the available Points of Presence in the system, such as their locations, capacities, and current status. The PoP database 6247 may include data associated with server specifications, network connectivity, bandwidth availability, latency measurements, and historical performance metrics. The PoP database 6247 may also store information on nearby data centers, peering arrangements, and optimal routing paths. The PoP database 6247 may be updated in real-time based on network monitoring tools and may include historical performance data. This data may be used for capacity planning, troubleshooting, and optimizing network performance.

The server database 6248 may contain data about the VPN servers and their capabilities, including supported protocols, encryption methods, and performance metrics. The server database 6248 may include details on server hardware specifications, operating systems, available IP addresses, load balancing configurations, and security certifications. The server database 6248 may receive information from automated server discovery processes, manual configuration by system administrators, or integration with cloud infrastructure management systems. In some cases, the server database 6248 may also store data on server maintenance schedules, software update statuses, and compliance with data protection regulations.

The service engine 6242 may be configured for processing information associated with incoming requests and applying the appropriate security measures based on the SIM security service policies. The incoming requests may include requests to access a target, requests to access SIM security services provided by the security service platform 6040, or any other type of request associated with access via the network 6020. In some aspects, for example, a request to access a target may be transmitted by the client 6010 to the service provider 6030 or a PoP (e.g., PoP 1 6052). The service provider 6030 or the PoP 1 6052 may transmit first information associated with the request to the security service platform 6040.

The first information may include metadata such as, for example, identifying information associated with the client 6010. As used herein, the term "metadata" refers to any type of data that may be communicated between two or more components to facilitate providing aspects of the SIM security services described herein. The service engine 6242 may access the data store 6245 to retrieve, based on the first information, second information. The second information may include metadata that includes identifying information associated with the service provider 6030, identifying information associated with the PoP 1 6052, information associated with a SIM security service, and/or the like. The service engine 6242 may determine routing paths associated with a SIM security policy. For example, The service engine 6242 may apply security services and determine routing paths in various ways. For example, when processing an incoming request, the service engine 6242 may first analyze the first information and/or the second information, such as the client's MSISDN, ICCID, and current location. It may then cross-reference this information with the user's profile stored in the user database 6246 to determine applicable security policies and preferences.

For example, in some implementations, the first information may be indicative of a SIM security service that a user of the client 6010 would like applied to communications between the client 6010 and a target. The first information may include a SIM security service ID corresponding to a specific security policy, set of security rules, routing plan, set of optimizations, and/or the like. The first information may include user input indicative of configuration information that may indicate one or more configuration settings associated with a SIM security policy. A SIM security policy may include any number of different types of security configurations, tunneling configurations, VPN routing plans, PoP routing plans, optimizations, and/or other functions that may be applied to communications from the client 6010.

The service engine 6242 may apply security measures such as encryption, traffic obfuscation, protocol switching, and multi-factor authentication. For encryption, the service engine may select an appropriate encryption protocol based on the sensitivity of the data being transmitted. For instance, the service engine 6242 may apply AES-256 encryption for financial transactions or TLS 1.3 for general web browsing. To enhance privacy, the service engine 6242 may implement traffic obfuscation techniques like packet padding or traffic shaping to make it more difficult for third parties to analyze the network traffic. The service engine 6242 may dynamically switch between different VPN protocols (e.g., OpenVPN, WireGuard, or IPSec) based on network conditions and security requirements. For sensitive operations, the service engine 6242 may trigger additional authentication steps, such as requesting a one-time password or biometric verification.

When determining routing paths, the service engine 6242 may consider factors such as geographic restrictions, network performance, load balancing, threat avoidance, and custom exit nodes. If a user is attempting to access geo-restricted content, the service engine 6242 may route the traffic through a PoP in an appropriate country. By consulting the PoP database 6247, the service engine 6242 may select a routing path that offers a combination of security and performance, considering factors like latency and available bandwidth. The service engine 6242 may distribute traffic across multiple PoPs or VPN servers to optimize resource utilization and maintain service quality. If the service engine 6242 detects potential security threats and/or network stability and/or performance issues along certain network paths, it may dynamically reroute traffic to avoid these risks. For users with specific privacy requirements, the service engine 6242 may route traffic through pre-defined exit nodes or allow users to select their preferred exit points.

In some implementations, the service engine 6242 may employ machine learning algorithms to continuously optimize its decision-making processes. For example, the service engine 6242 may analyze historical data to predict network congestion and proactively adjust routing paths. In some implementations, the service engine 6242 may also learn from past security incidents to improve threat detection and response mechanisms.

The service engine 6242 may also interact with the VPN server selector 6243 to choose an appropriate VPN server for each connection. This selection may be based on factors such as server load, geographic location, and specific security features supported by each server. For instance, if a user requires access to a particular streaming service, the VPN server selector 6243 may choose a server known to work well with that service while still meeting the user's security requirements. The VPN server selector 6243 may determine the most appropriate VPN server for routing a client's traffic based on factors such as user preferences, server load, geographic location, and current network conditions.

The event streaming platform 6244 may facilitate real-time data processing and analytics within the security service platform 6040. The event streaming platform 6244 may be used for monitoring system performance, detecting anomalies, and providing insights that can be used to optimize the service and respond to potential security threats in real-time. The event streaming platform 6244 may facilitate real-time data processing and communication between various components of the secure SIM networking service. In some implementations, the event streaming platform 6244 may be, be similar to, include, or be included in, an Apache Kafka or a similar distributed event streaming platform.

The event streaming platform 6244 may act as a central nervous system for the security service platform 6040, enabling real-time data flow and processing across different components. The event streaming platform 6244 may allow for the creation of data pipelines that can handle high volumes of events or messages in real-time, providing a scalable and fault-tolerant infrastructure for data exchange. In some aspects, the event streaming platform 6244 may interact with the security service platform 6040 to stream real-time security events, such as potential threats detected or policy violations. This may enable the security service platform 6040 to respond quickly to emerging security issues, potentially adjusting security measures in real-time based on the incoming stream of events.

The event streaming platform 6244 may interface with the data store 6245, facilitating real-time updates to the user database 6246, PoP database 6247, and server database 6248. For instance, when a user updates their preferences or when network conditions change, these updates may be streamed in real-time to the relevant databases, ensuring that the most current information is always available for decision-making processes.

In some implementations, the event streaming platform 6244 may provide a constant stream of data about network conditions, user activities, and security events to the service engine 6242. This real-time data flow may enable the service engine 6242 to make more informed and timely decisions about routing paths and security measures. For example, if the event streaming platform 6244 detects a sudden increase in traffic or a potential security threat in a particular region, it may immediately notify the service engine 6242, which can then adjust its routing decisions accordingly. The event streaming platform 6244 may support the VPN server selector 6243 by providing real-time data on VPN server performance and load. This may allow the VPN server selector 6243 to make more accurate and up-to-date server selections based on current conditions rather than relying solely on periodic updates.

In some aspects, the event streaming platform 6244 may facilitate machine learning processes within the security service platform 6040. The event streaming platform 6244 may stream large volumes of data to machine learning models, enabling them to learn and adapt in real-time. This could be particularly useful for anomaly detection, predictive maintenance, and continual optimization of routing and security decisions.

The event streaming platform 6244 may provide a mechanism for real-time monitoring and alerting. The event streaming platform 6244 may stream key performance indicators (KPIs) and other important metrics to monitoring dashboards, allowing system administrators to keep a close eye on the health and performance of the entire SIM networking service. In some implementations, the event streaming platform 6244 may support the implementation of complex event processing (CEP) capabilities. This may allow the system to detect and respond to complex patterns of events in real-time, further enhancing its ability to identify and mitigate security threats or optimize performance. The event streaming platform 6244 may facilitate integration with external systems and services. For instance, the event streaming platform 6244 may stream relevant data to third-party analytics platforms or security information and event management (SIEM) systems, enhancing the overall capabilities of the SIM networking service.

The PoP system 6050 consists of multiple PoPs distributed across various geographic locations. In the diagram, these are represented by PoP 1 6052, PoP 2 6054, and PoP N 6056, indicating that the system can scale to include any number of PoPs as needed. Each PoP serves as an intermediary routing point, enabling efficient and secure transmission of data between the client and its final destination. The PoPs in the system may be implemented in various ways to enhance the security and performance of SIM networking, even without relying on VPN functionalities. For example, PoPs may be configured as edge computing nodes, allowing for localized processing and security enforcement closer to the end-users. In this configuration, PoPs may perform tasks such as traffic inspection, threat detection, and application-level filtering at the network edge, reducing latency and improving overall security posture.

In some implementations, PoPs may incorporate SDN capabilities, enabling dynamic routing and traffic management based on real-time network conditions and security policies. This may allow for rapid adaptation to emerging threats or changing network topologies without requiring manual intervention. In some implementations, PoPs may serve as secure access service edge (SASE) nodes, combining network security functions with WAN capabilities to support secure access for SIM-enabled devices. In this role, PoPs may provide services such as zero trust network access (ZTNA), secure web gateways (SWG), and cloud access security brokers (CASB) to ensure secure connectivity for SIM users regardless of their location.

In some implementations, PoPs may be equipped with hardware security modules (HSMs) to provide enhanced cryptographic capabilities. These HSMs may be used for secure key storage, encryption, and digital signing operations, further strengthening the security of SIM communications without relying on traditional VPN technologies. In some implementations, PoPs may implement advanced traffic analysis techniques, such as DPI and behavioral analytics, to identify and mitigate potential security threats in real-time. By analyzing traffic patterns and content at the PoP level, the system may detect and respond to anomalies or malicious activities before they reach their intended targets.

In some implementations, PoPs may serve as content delivery network (CDN) nodes, caching frequently accessed content closer to end-users. This may not only improve performance but also enhance security by reducing the need for SIM-enabled devices to communicate directly with origin servers for every request. In some implementations, PoPs may also incorporate network function virtualization (NFV) technologies, allowing for the dynamic deployment of security services as needed. This flexibility may enable the system to rapidly adapt to changing security requirements or to scale specific security functions based on demand.

In some aspects, PoPs may implement protocol-aware security measures, such as API gateways or web application firewalls (WAFs), to provide application-layer protection for SIM-based communications. These measures may help prevent attacks such as SQL injection, cross-site scripting (XSS), or API abuse that traditional network-level security controls might miss. In some implementations, PoPs may serve as secure DNS resolvers, implementing technologies such as DNS over HTTPS (DoH) or DNS over TLS (DOT) to protect SIM users from DNS-based attacks and enhance privacy by encrypting DNS queries. In some implementations, PoPs may incorporate machine learning-based anomaly detection systems, continuously analyzing network traffic to identify and respond to previously unknown threats or attack patterns. This proactive approach may help maintain a robust security posture for SIM networking without relying solely on predefined security rules or signatures.

The VPN 6060 component of the system comprises multiple VPN servers, represented in the diagram as VPN server 1 6062, VPN server 2 6064, and VPN server M 6066. This scalable architecture allows the system to support a large number of concurrent users while providing options for geographic diversity in exit points. The VPN servers encrypt the client's traffic and provide an additional layer of privacy by masking the client's true IP address.

In operation, when a client 6010 initiates a request to access a target (e.g., a website), the request may be first sent through the network 6020 to the service provider 6030 (or directly to a PoP). The service provider 6030 may forward the request to a PoP 1 6052 associated with the service provider 6030. The service provider 6030 and/or the PoP 1 6052 may forward first information (e.g., first metadata associated with the request and/or the client 6010) to the security service platform 6040. The first information may include data such as an MSISDN, an ICCID, an IP address, or location information associated with the client 6010. The first information also may include user input indicative of a SIM security policy, configuration settings, and/or any other information that may be used to facilitate providing services to the client 6010. The security service platform 6040 may process this information, consulting the data store 6245 to retrieve second information (e.g., second metadata such as user preferences, device identifiers, historical behavior patterns, or network configurations). The second information may include data such as a MSISDN, an ICCID, an IP address associated with the client 6010, a SIM security policy identifier, or an IP address associated with the service provider 6030. In some implementations, the security service platform 6040 may analyze both the first and second information to generate a comprehensive security profile for the request. This profile may be used to determine appropriate security policies, optimize routing decisions, and apply tailored security measures based on the specific characteristics of the client 6010 and the nature of the request. The security service platform 6040 may then forward service information associated with an appropriate SIM security service to be applied to the PoP 1 6052. This service information may include instructions for implementing specific security protocols, encryption methods, or routing preferences based on the analyzed metadata and security policies.

The security service platform 6040 may process and utilize various types of metadata to enhance the security and efficiency of SIM-based communications. For example, the security service platform 6040 may receive first metadata from the service provider 6030 and may access second metadata. The security service platform 6040 may access the second metadata by receiving the second metadata and/or by accessing the data store 6245, which may include at least a portion of the second metadata.

The first metadata may include information associated with the specific request originating from the client. This may encompass details such as a MSISDN associated with the client, an ICCID associated with an eSIM component of the client, an IP address associated with the client, or location information associated with the client. For example, the MSISDN may be used to identify the specific mobile subscription, while the ICCID may provide unique identification for the SIM itself. Location information may include GPS coordinates, cell tower triangulation data, or IP geolocation information.

The second metadata may comprise additional information associated with the client that may not be directly related to the current request but may be relevant for security and routing decisions. This may include details such as an MSISDN associated with the client (which may be different from the one used for the current request in case of multi-SIM devices), an ICCID associated with an eSIM component of the client (which may be useful for devices with multiple eSIMs), an IP address associated with the client, or an IP address associated with the service provider.

For instance, the security service platform 6040 may use the first metadata to verify the authenticity of the request and ensure it originates from a legitimate SIM-enabled device. The MSISDN and ICCID information may be cross-referenced with the user database to confirm the identity of the client and retrieve associated security policies. The second metadata may be utilized for more complex security and routing decisions. For example, if the IP address associated with the client differs significantly from the location information provided in the first metadata, it may trigger additional security checks to prevent potential location spoofing attempts. Similarly, the IP address associated with the service provider 6030 may be used to verify that the request is coming through an authorized network path.

In some implementations, the security service platform 6040 may combine both types of metadata to create a comprehensive security profile for each request. This profile may be used to determine the most appropriate routing path, select the optimal PoP for processing the request, and apply tailored security measures based on the specific characteristics of the client and the nature of the request.

The service engine 6242 may determine an optimal routing path for a communication, potentially in consultation with the VPN server selector 6243 if VPN routing is required. Based on this decision, the communication is forwarded to the appropriate PoP within the PoP system 6050. The chosen PoP then routes the communication either directly to its destination or through one of the VPN servers in the VPN 6060 component, depending on the security requirements and user preferences. Throughout this process, the event streaming platform 6244 may be collecting and analyzing data about the request and the system's performance, enabling real-time monitoring and optimization of the service. Various implementations described above may allow the system 6000 to provide a secure, flexible, and efficient SIM networking service that can adapt to various user needs and security requirements.

The experience service component 6250 may provide a user interface and functionality for clients to interact with and configure the secure SIM networking service. This component may allow users to view and modify their security settings, monitor their network usage, and receive notifications about potential security threats or service updates. In some implementations, the experience service component 6250 may be accessible through a mobile application installed on the client device, a web portal, or both, providing flexibility in how users manage their secure SIM networking experience. As shown, the client 6010 may include an application 6012. The application 6012 may access this information via an API provided by the experience service component 6250 (e.g., via the API 6241). For example, the application 6012 on the client 6010 may make API calls to retrieve usage statistics, current security settings, or available configuration options. The API may also allow the app to submit changes to security preferences or request specific actions, such as enabling enhanced encryption for a particular session. This integration between the client-side app and the experience service component may enable real-time updates and responsive control over the secure SIM networking service directly from the user's device.

The experience service component 6250 may offer a range of features to enhance user control and visibility over their secure SIM networking service. For example, it may provide real-time statistics on data usage, including breakdowns by application or service type. Users may be able to view which security measures are currently active, such as VPN usage or threat protection features, and toggle these features on or off as needed. The component may also offer the ability to select preferred exit points for VPN connections, allowing users to choose specific countries or regions for their traffic routing.

In some cases, the experience service component 6250 may include advanced reporting and analytics capabilities. It may generate periodic reports on network usage, security events, and performance metrics, helping users understand their usage patterns and the effectiveness of the security measures in place. For enterprise clients, this component may offer additional features such as centralized management of multiple SIM-enabled devices, allowing IT administrators to apply security policies across an entire fleet of devices from a single interface. The experience service component 6250 may also facilitate communication between users and the service provider, offering in-app support features, notification systems for service updates or security alerts, and channels for user feedback to continually improve the secure SIM networking service.

As described above, the security service platform 6040 may function as a control plane for the PoP system 6050 and/or the VPN 6060, orchestrating the overall security and routing operations of the secure SIM networking service. In this capacity, the security service platform 6040 may process information associated with incoming requests, analyze metadata, apply security policies, and make decisions about how to handle each communication. These decisions may then be implemented by the PoP system 6050 and VPN 6060, which act as the data plane, handling the actual routing and transmission of data.

For example, when a client 6010 initiates a request to access a website, the security service platform 6040 may receive metadata about the request from the service provider

6030. The platform may then analyze this metadata along with stored user preferences and current network conditions. Based on this analysis, the security service platform 6040 may determine that the request should be routed through a specific PoP and VPN server to optimize performance and security. The platform may then send instructions to the chosen PoP within the PoP system 6050, specifying how to handle the request. These instructions may include which security measures to apply, whether to route the traffic through a VPN, and if so, which VPN server to use. The PoP and VPN server would then execute these instructions, applying the specified security measures and routing the traffic as directed by the security service platform 6040.

In one example of a use case scenario, consider a multinational corporation using the secure SIM networking service for its employees' devices. An employee traveling abroad may attempt to access sensitive company resources. The security service platform 6040 may receive metadata about this request, including the employee's current location and the resource being accessed. The platform may then consult the company's security policies stored in its data store 6245. Based on this information, the security service platform 6040 may determine that the request requires additional authentication and must be routed through a VPN server in the company's home country. The platform would then instruct a PoP in the employee's current location to request additional authentication from the user. Once authenticated, the platform would direct the PoP to route the traffic through a specific VPN server, applying encryption and other security measures in the process. Throughout this interaction, the security service platform 6040 acts as the central decision-making entity, while the PoP system 6050 and VPN 6060 execute its instructions to provide a secure connection for the employee.

In another use case scenario, a global logistics company may implement the secure SIM networking service to manage its fleet of connected vehicles. Each vehicle may be equipped with an eSIM-enabled telematics unit that continuously transmits data about the vehicle's location, fuel consumption, and cargo conditions. The security service platform 6040 may receive this data through various PoPs as the vehicles move across different regions. The platform may analyze the metadata associated with each transmission, including the vehicle's unique identifier, current location, and the type of data being sent. Based on this analysis, the security service platform 6040 may apply different security policies depending on the sensitivity of the information. For instance, basic telemetry data may be routed directly to the company's cloud servers, while more sensitive information about high-value cargo may be encrypted and routed through a VPN for added security.

In an IoT use case scenario, a smart home system may utilize the secure SIM networking service to protect the various connected devices within a household. Devices such as smart thermostats, security cameras, and voice assistants may each have their own eSIM, allowing them to communicate directly with the home automation hub and external services. The security service platform 6040 may receive metadata about each device's communications, including device type, data being transmitted, and intended recipient. For a security camera stream, the platform may determine that the video feed should be encrypted and routed through a VPN to the homeowner's mobile device when they are away from home. In contrast, for a smart thermostat's routine temperature updates, the platform may apply lighter security measures and route the data directly to the manufacturer's cloud service for analysis.

An IIOT (Industrial Internet of Things) use case scenario may involve a large manufacturing plant using the secure SIM networking service to manage its network of industrial sensors and control systems. Each piece of machinery on the factory floor may be equipped with multiple sensors, all connected via eSIMs. The security service platform 6040 may receive a constant stream of data from these sensors, with metadata indicating the specific machine, sensor type, and nature of the readings. For critical control systems that manage potentially dangerous processes, the platform may implement strict security measures, such as multi-factor authentication for any remote access attempts and routing all commands through a dedicated, encrypted VPN tunnel. For less critical systems, like energy usage monitors, the platform may apply different security policies, balancing the need for real-time data access with appropriate security measures.

In a healthcare-related use case scenario, a telemedicine provider may leverage the secure SIM networking service to ensure the privacy and security of patient data during remote consultations. Portable medical devices used by patients at home, such as heart rate monitors or blood glucose meters, may be equipped with eSIMs to transmit data to healthcare providers. The security service platform 6040 may receive metadata about these transmissions, including the device type, patient identifier, and type of medical data being sent. Given the sensitive nature of medical information, the platform may apply stringent security measures to all communications. This may include encrypting all data transmissions, routing them through geographically appropriate PoPs to ensure compliance with regional data protection regulations, and using dedicated VPN servers for added security. The platform may also implement adaptive security measures, increasing protection levels if it detects any unusual patterns in the metadata that could indicate a potential security threat.

In a biological sensor use case scenario, a research institution may deploy a network of environmental monitoring stations equipped with eSIM-enabled biological sensors to study ecosystem health across various habitats. These sensors may collect data on microbial activity, air and water quality, and the presence of specific organisms. The security service platform 6040 may receive continuous data streams from these sensors, with metadata including sensor location, type of biological data collected, and environmental conditions. For sensors placed in sensitive or protected areas, the platform may implement enhanced security measures, such as data anonymization and encryption before transmission. The platform may route this data through specific PoPs that are geographically closest to the research institution's data centers to minimize latency. For sensors detecting potential environmental hazards or sudden changes in ecosystem health, the platform may prioritize these transmissions, routing them through dedicated VPN tunnels to ensure rapid and secure delivery to relevant authorities or emergency response teams.

In a drone-related use case scenario, a precision agriculture company may utilize a fleet of eSIM-equipped drones for crop monitoring and management. These drones may capture high-resolution imagery, collect soil moisture data, and apply targeted treatments to crops. The security service platform 6040 may handle the diverse data streams from these drones, processing metadata that includes drone identification, flight path, sensor readings, and captured imagery. For routine monitoring flights, the platform may apply standard encryption and route the data directly to the company's cloud-based analysis systems. However, for drones carrying out more sensitive operations, such as applying proprietary treatment formulas, the platform may implement stricter security protocols. This may include routing all command and control signals through a VPN, using geofencing to ensure drones only operate within designated areas, and applying additional encryption layers to protect the company's intellectual property. The platform may also adapt its security measures based on the drone's location, implementing stricter controls when operating near property boundaries or in areas with potential signal interference.

In a robotics-focused use case scenario, a multinational manufacturing company may deploy a network of eSIM-enabled collaborative robots (cobots) across its global factories. These cobots may work alongside human employees, performing tasks ranging from assembly to quality control. The security service platform 6040 may manage the communication for these cobots, processing metadata that includes robot identification, current task, location within the factory, and interaction logs with human workers. For routine operations, the platform may route data through local PoPs to minimize latency, enabling real-time coordination between cobots and central control systems. When cobots are involved in producing highly confidential products or prototypes, the platform may activate enhanced security protocols. This may include routing all data through multiple VPN hops to obscure the true origin of the data, implementing advanced encryption for all transmissions, and requiring multi-factor authentication for any remote access or programming attempts. The platform may also monitor for any unusual patterns in cobot behavior or unexpected changes in metadata, which could indicate a potential security breach or malfunction.

In an augmented reality (AR) use case scenario, a global architecture firm may utilize eSIM-enabled AR headsets for remote collaboration and on-site project visualization. These headsets may allow architects and engineers to overlay digital models onto physical construction sites, facilitating real-time design adjustments and progress monitoring. The security service platform 6040 may manage the complex data flows associated with these AR applications, processing metadata that includes user identity, headset location, project identifiers, and the nature of the AR content being accessed or modified. For general collaboration sessions, the platform may route communications through geographically optimized PoPs to ensure low-latency experiences for all participants. When accessing or modifying sensitive project data, such as proprietary designs or client-confidential information, the platform may implement additional security measures. This may include routing all AR data streams through dedicated VPN tunnels, applying dynamic watermarking to visual content to deter unauthorized sharing, and using adaptive encryption that adjusts based on the sensitivity of the information being transmitted. The platform may also leverage its event streaming capabilities to monitor for potential security anomalies, such as unexpected access attempts or unusual data transfer patterns, allowing for real-time threat mitigation.

Figure 7:
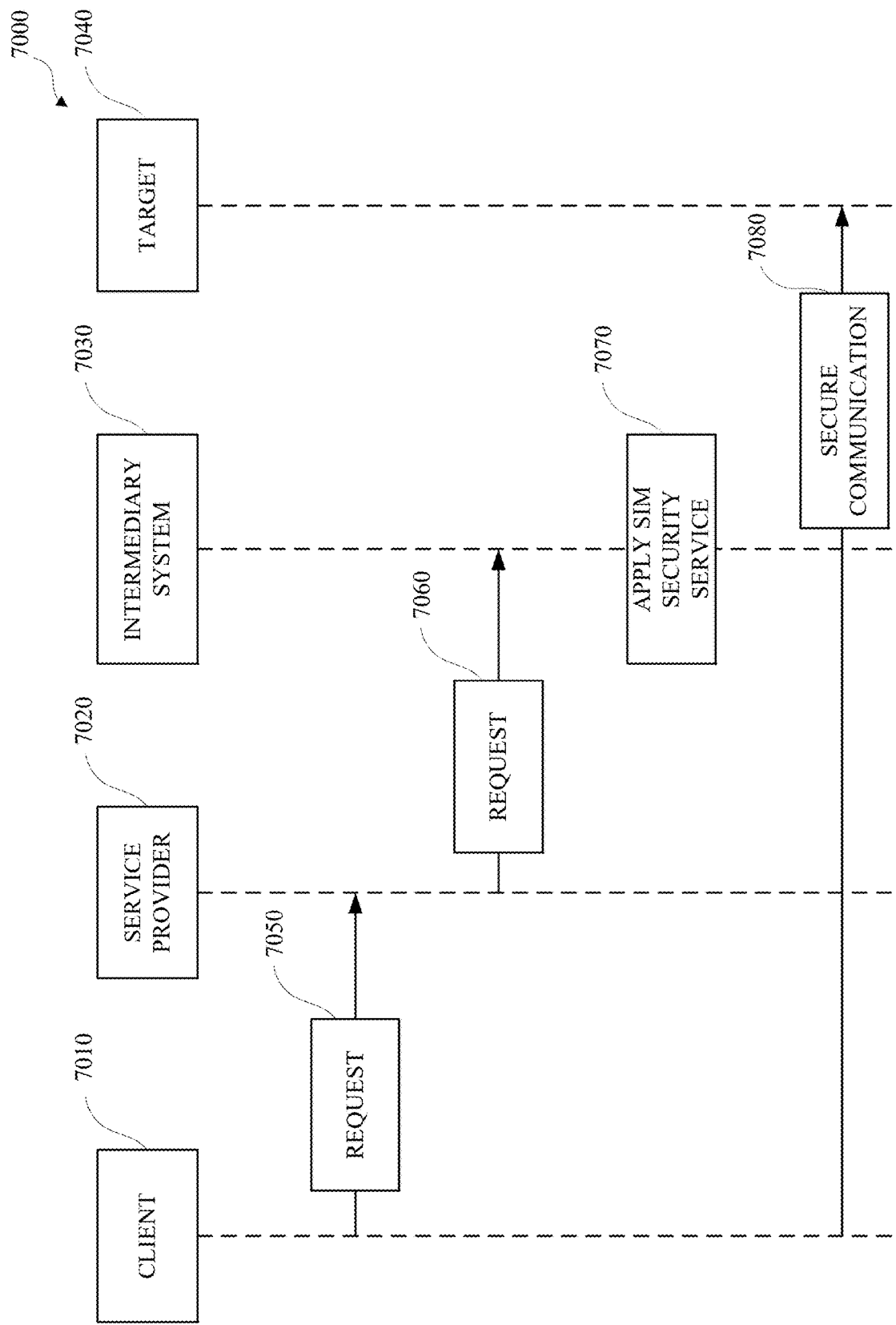
FIG. 7 is a flow diagram of an exemplary process associated with a secure SIM networking service.

FIG. 7 is a flow diagram of an exemplary process 7000 associated with a secure SIM networking service. FIG. 7 illustrates a client 7010, a service provider 7020, an intermediary system 7030, and a target 7040. Each of the client 7010, the service provider 7020, the intermediary system 7030, and the target 7040 may be generically referred to as a system component. A system component refers to one or more devices and/or applications. Where a system component is or refers to a device, the system component can be, be similar to, include, or be included in a computing system, which can include one or more computing devices (e.g., one or more of the computing device 1000 of FIG. 1). Where a system component is or refers to an application, the system component can be, be similar to, include, or be included in an instance of software running on a device (e.g., a computing device). In some implementations, a system component can be implemented as a single physical unit or as a combination of physical units. In some implementations, a single physical unit can include multiple components.

The client 7010 may initiate the process, as shown at 7050, by sending a request associated with accessing the target 7040. This request may be for various purposes, such as accessing a website, retrieving data from a server, or initiating a secure transaction. The service provider 7020 may receive the request from the client 7010. Upon receiving the request, at 7060, the service provider 7020 may forward the request to the intermediary system 7030. This forwarding process may involve appending additional metadata to the request, such as the client's MSISDN, ICCID, or current location information. This metadata may enable the intermediary system 7030 to apply appropriate security measures and routing decisions.

The intermediary system 7030 may process the request by applying a SIM security service, represented by block 7070. This security service may perform various functions to enhance the privacy and security of the communication. The SIM security service may include several layers of security measures. For instance, the intermediary system 7030 may verify the authenticity of the request using the metadata provided by the service provider 7020. In some implementations, the intermediary system 7030 may also apply user-defined security policies, such as traffic encryption, DNS-based threat protection, or routing preferences. In some implementations, the security service may use machine learning algorithms to detect and respond to potential security threats in real-time.

By processing the request through the SIM security service, the intermediary system 7030 may generate a secure communication, which provided to the target 7040. The secure communication may be encrypted, its apparent origin may be masked, or it may be routed through a specific VPN server based on user preferences or security requirements.

In some implementations, the intermediary system 7030 may process the request to determine a SIM security service to be applied to data communications from the client addressed to the target. For example, the intermediary system 7030 may analyze metadata associated with the request, such as the client's MSISDN, ICCID, current location, or other relevant information provided by the service provider 7020. Based on this analysis, the intermediary system 7030 may select an appropriate SIM security service that aligns with the client's security requirements and preferences.

The SIM security service may encompass various security measures and protocols that can be applied to the data communications, which may include protocol data units (PDUs) transmitted from the client 7010 to the target 7040. These security measures may include encryption, traffic obfuscation, protocol switching, or routing through specific network paths. For instance, the intermediary system 7030 may determine that all PDUs from a particular client 7010 should be encrypted using a specific algorithm, or that traffic should be routed through a series of predetermined PoPs before reaching the target 7040.

In some cases, the intermediary system 7030 may consult a database or policy engine to determine the appropriate SIM security service based on factors such as the client's identity, the nature of the request, or current network conditions. The system may also take into account user-defined preferences or corporate security policies associated with the client's SIM.

Once the SIM security service is determined, the intermediary system 7030 may apply it to the data communications in real-time. This may involve intercepting PDUs from the client 7010, applying the necessary security measures, and then forwarding the secured PDUs to the target 7040. The application of the SIM security service may be transparent to both the client 7010 and the target 7040, allowing for enhanced security without requiring changes to existing applications or protocols.

In some implementations, the intermediary system 7030 may dynamically adjust the SIM security service based on ongoing analysis of the communication stream. For example, if the system detects potential security threats or unusual patterns in the data flow, it may automatically enhance the security measures applied to subsequent PDUs. This adaptive approach may allow for a flexible and responsive security framework that can address emerging threats in real-time.

The intermediary system 7030 may also provide feedback to the client 7010 or service provider 7020 about the applied SIM security service. This feedback may include information about the types of security measures applied, any potential threats that were mitigated, or suggestions for enhancing the security of future communications. Such feedback may be provided through a user interface, API, or other reporting mechanisms, allowing for greater visibility and control over the security of SIM-based communications.

In some implementations of this disclosure, the process 7000 may include additional steps or variations. For example, the intermediary system 7030 may communicate back to the client 7010 through the service provider 7020 to request additional authentication or to provide status updates on the request processing. Additionally, the system may be configured to handle responses from the target 7040, applying similar security measures to the return path of the communication. In some aspects, the intermediary system 7030 may implement advanced traffic analysis techniques, such as DPI and behavioral analytics, to identify and mitigate potential security threats in real-time. The system may also incorporate NFV technologies, allowing for the dynamic deployment of security services as needed.

In some implementations, the intermediary system 7030 may provide options for dedicated leased lines or wave/dark fiber connections to enhance security and performance for certain clients or applications. The system may also support various tunneling protocols such as GRE, NVGRE, GENEVE, VXLAN, and IPSec to enable secure data transmission across different network environments.

The intermediary system 7030 may incorporate MPLS functionality in some aspects. This may allow for efficient and flexible routing of SIM traffic, potentially improving network performance and enabling advanced traffic engineering capabilities. The system may use MPLS to establish VPNs for secure client communications or to prioritize certain types of traffic based on QoS requirements.

In some implementations, the intermediary system 7030 may employ machine learning algorithms to continuously optimize its decision-making processes. For example, the system may analyze historical data to predict network congestion and proactively adjust routing paths. The system may also learn from past security incidents to improve threat detection and response mechanisms.

The intermediary system 7030 may provide an experience service component in some aspects. This component may offer a user interface for clients to interact with and configure the secure SIM networking service. Users may be able to view and modify their security settings, monitor their network usage, and receive notifications about potential security threats or service updates. In some implementations, this component may be accessible through a mobile application installed on the client device, a web portal, or both, providing flexibility in how users manage their secure SIM networking experience.

Figure 8:
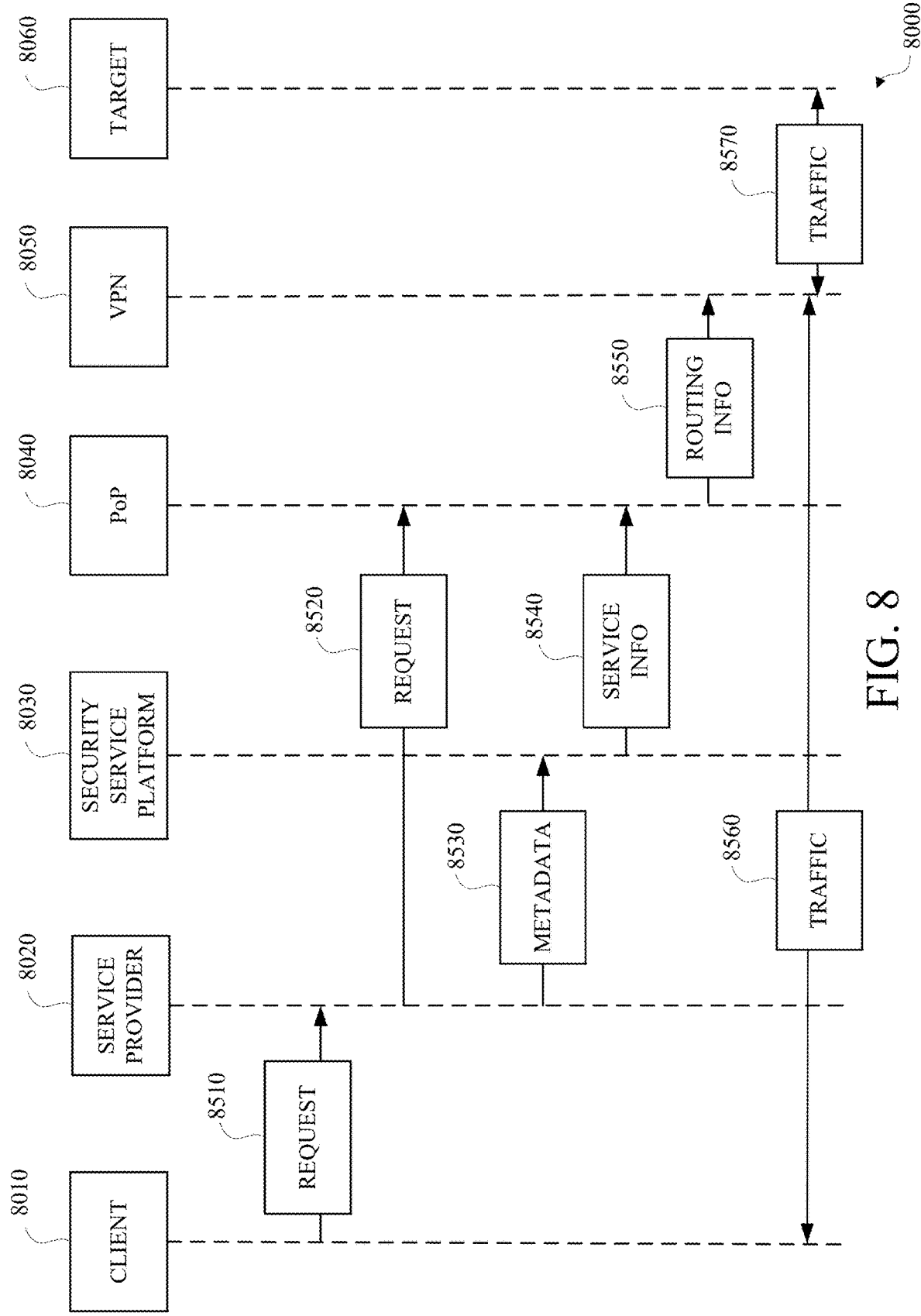
FIG. 8 is a flow diagram of another exemplary process associated with a secure SIM networking service.

FIG. 8 is a flow diagram of another exemplary process 8000 associated with a secure SIM networking service. FIG. 8 illustrates a client 8010, a service provider 8020, a security service platform 8030, a PoP 8040, a VPN 8050, and a target 8060. Each of the client 8010, the service provider 8020, the security service platform 8030, the PoP 8040, the VPN 8050, and the target 8060 may be generically referred to as a system component. A system component refers to one or more devices and/or applications. Where a system component is or refers to a device, the system component can be, be similar to, include, or be included in a computing system, which can include one or more computing devices (e.g., one or more of the computing device 1000 of FIG. 1). Where a system component is or refers to an application, the system component can be, be similar to, include, or be included in an instance of software running on a device (e.g., a computing device). In some implementations, a system component can be implemented as a single physical unit or as a combination of physical units. In some implementations, a single physical unit can include multiple components.

As shown at 8510, the client 8010 sends a request to the service provider 8020. The service provider 8020 forwards the request to the security service platform 8030, as shown at 8520. The service provider 8020 also sends metadata 8530 to the security service platform 8030. This metadata 8530 may include information about the client and the request, such as the client's MSISDN, ICCID, current location, or other relevant data that can aid in security decision-making.

The security service platform 8030 may process the request and the metadata to generate service information, which the security service platform 8030 may provide to the PoP 8040, as shown at 8540. In some implementations, the security service platform 8030 may combine the received metadata with additional data stored in its databases, such as user preferences, historical behavior patterns, or current threat intelligence. The service information 8540 may include security policies to be applied, routing decisions, or instructions for further processing of the request.

The PoP 8040 may, based on the service information, provide routing information to the VPN 8050, as shown at 8550. The routing information may specify the optimal path for the request, taking into account factors such as security requirements, performance optimization, and user preferences. In some implementations, the routing information may include instructions for encrypting the traffic, selecting a specific exit node, or applying additional security measures. The VPN 8050, upon receiving the routing information 8550, establishes a secure connection for moving data traffic between the client 8010 and the target 8060, as shown at 8560 and 8570.

In some implementations, the process 8000 may include additional steps or variations. For example, the security service platform 8030 might employ machine learning algorithms to dynamically adjust security measures based on real-time threat intelligence. The PoP 8040 could incorporate edge computing capabilities to provide low-latency security services closer to the end-user. The VPN 8050 might offer advanced features such as split tunneling or multi-hop connections for enhanced security and flexibility.

Figure 9:
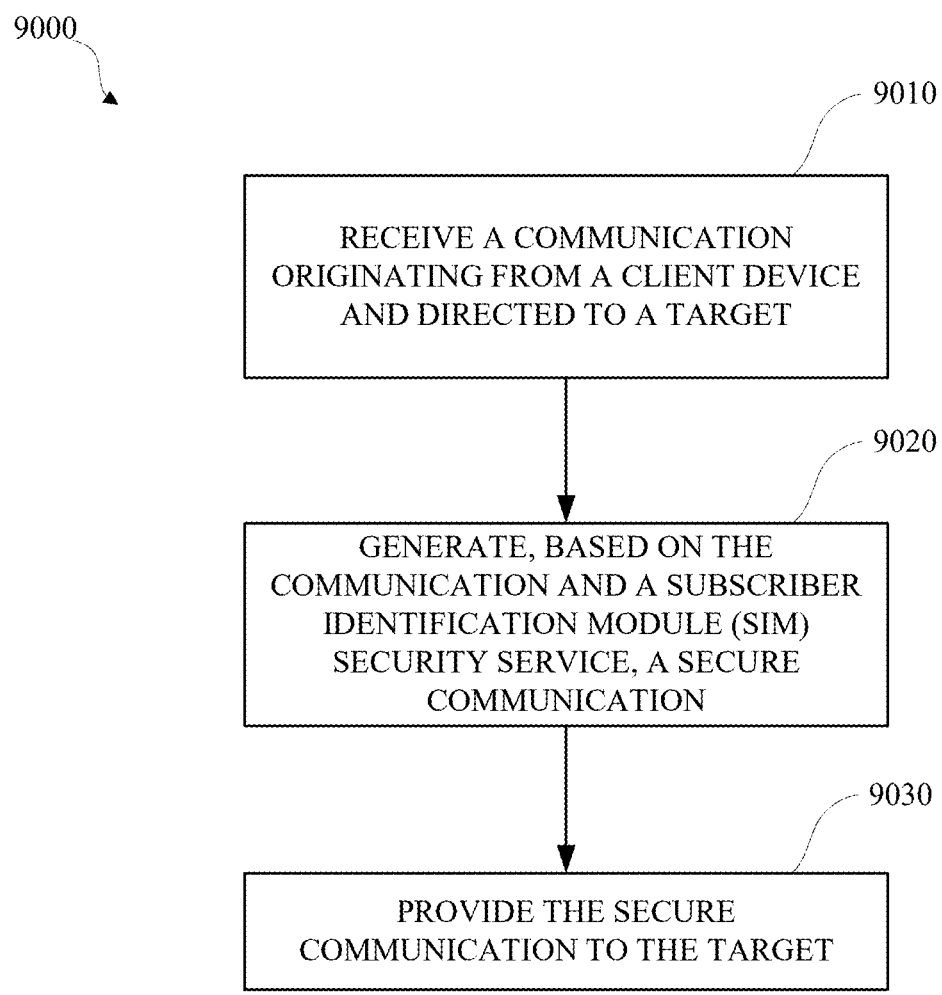
FIG. 9 is a flowchart of a technique for providing a secure SIM networking service.

To further describe some implementations in greater detail, reference is next made to examples of techniques which may be performed in association with a secure SIM networking service. FIG. 9 is a flowchart of a technique 9000 for providing a secure SIM networking service. The technique 9000 can be executed using computing devices, such as the systems, hardware, and software described with respect to FIGS. 1-8. The technique 9000 can be implemented, for example, as a software program that may be executed by computing devices such as the computing device 1000 of FIG. 1. The software program can include machine-readable instructions that may be stored in a memory such as the memory 1300, and that, when executed by a processor, such as the processor 1200, may cause the computing device 1000 to perform the technique 9000. The technique 9000 may be implemented at least in part by an intermediary system, such as, for example, the intermediary system 5040 shown in FIG. 5, the intermediary system 4050 shown in FIG. 4, or the intermediary system 3040 shown in FIG. 3. The technique 9000 can be implemented using specialized hardware or firmware. Multiple processors, memories, or both, may be used.

At 9010, the technique 9000 includes receiving, by an intermediary system between a service provider and a target, a communication originating from a client device and directed to a target. In some implementations, the intermediary system comprises a security service platform and at least one of a PoP or a VPN. At 9020, the technique 9000 includes generating, based on the communication and a SIM security service, a secure communication. At 9030, the technique 9000 includes providing the secure communication to the target.

In some implementations, the technique 9000 includes receiving, from the service provider, first metadata associated with the communication; and accessing second metadata associated with the client device, wherein the secure communication may be based on the first metadata and the second metadata. In some implementations, the first metadata includes at least one of an MSISDN associated with the client device, an ICCID associated with an SIM component (e.g., an eSIM component) of the client device, an IP address associated with the client device, or location information associated with the client device. In some implementations, the second metadata includes at least one of an MSISDN associated with the client device, an ICCID associated with an eSIM component of the client device, an IP address associated with the client device, or an IP address associated with the service provider. In some implementations, the technique 9000 includes receiving user input indicative of an exit point, where the secure communication is based on the exit point. In some implementations, the exit point is associated with at least one of a virtual private network or a location (e.g., a country, a state, a city, or a region). The user input may be received from the client device.

In some implementations, the technique 9000 includes receiving, from the service provider, first metadata associated with the request and accessing second metadata associated with the client device, where the secure communication is based on the first metadata and the second metadata. In some implementations, at least a portion of the second metadata is stored in a data store of the security service platform. In some implementations, accessing the second metadata includes receiving at least a portion of the second metadata from the service provider. In some implementations, the security service platform includes a service engine and the technique 9000 includes generating, by the service engine, service information including the first metadata, the second metadata, and a service indication corresponding to the SIM security service.

In some implementations, the security service platform includes a service engine, and the technique 9000 includes selecting, by the service engine and based on at least one of the second metadata and the SIM security service, a PoP of a PoP system. In some implementations, providing the secure communication to the target includes transmitting the secure communication to the PoP for routing to the target. In some implementations, the technique 9000 includes determining, based on the SIM security service, a routing path associated with a VPN. In some implementations, providing the secure communication to the target includes transmitting, based on the routing path, the secure communication to the VPN.

Figure 10:
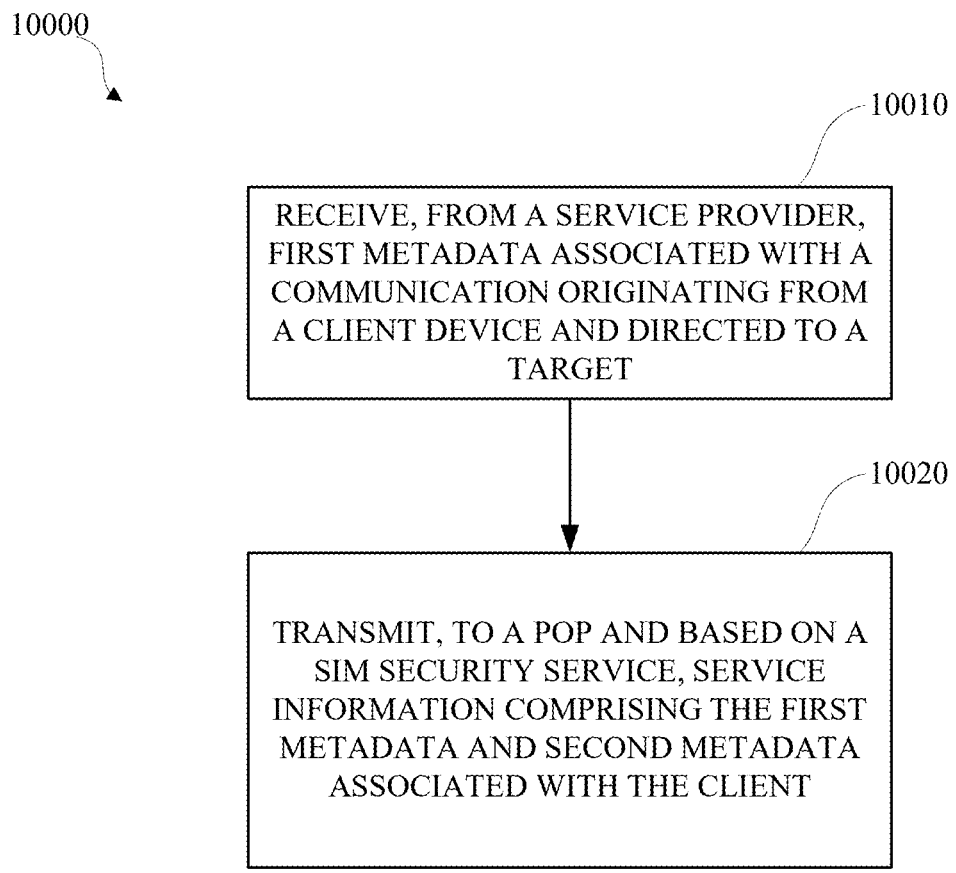
FIG. 10 is a flowchart of a technique for providing a secure SIM networking service.

FIG. 10 is a flowchart of a technique 10000 for providing a secure SIM networking service. The technique 10000 can be executed using computing devices, such as the systems, hardware, and software described with respect to FIGS. 1-8. The technique 10000 can be implemented, for example, as a software program that may be executed by computing devices such as the computing device 1000 of FIG. 1. The software program can include machine-readable instructions that may be stored in a memory such as the memory 1300, and that, when executed by a processor, such as the processor 1200, may cause the computing device 1000 to perform the technique 10000. The technique 10000 may be implemented at least in part by an intermediary system, such as, for example, the intermediary system 5040 shown in FIG. 5, the intermediary system 4050 shown in FIG. 4, or the intermediary system 3040 shown in FIG. 3. The technique 10000 can be implemented using specialized hardware or firmware. Multiple processors, memories, or both, may be used.

At 10010, the technique 10000 includes receiving, from a service provider, first metadata associated with a communication originating from a client device and directed to a target. At 10020, the technique 10000 includes transmitting, to a PoP and based on an SIM security service, service information including the first metadata and second metadata associated with the client.

In some implementations, the first metadata includes at least one of an MSISDN associated with the client, an ICCID associated with an eSIM component of the client device, location information associated with the client device, an IP address associated with the client device, or an exit point indication. In some implementations, the exit point is associated with at least one of a virtual private network or a location. In some implementations, the second metadata includes at least one of an MSISDN associated with the client device, an ICCID associated with an eSIM component of the client device, an IP address associated with the client device, or an IP address associated with the service provider. In some implementations, the technique 10000 includes determining, based on the SIM security service, a routing path associated with a VPN, where the service information is indicative of the routing path.

Figure 11:
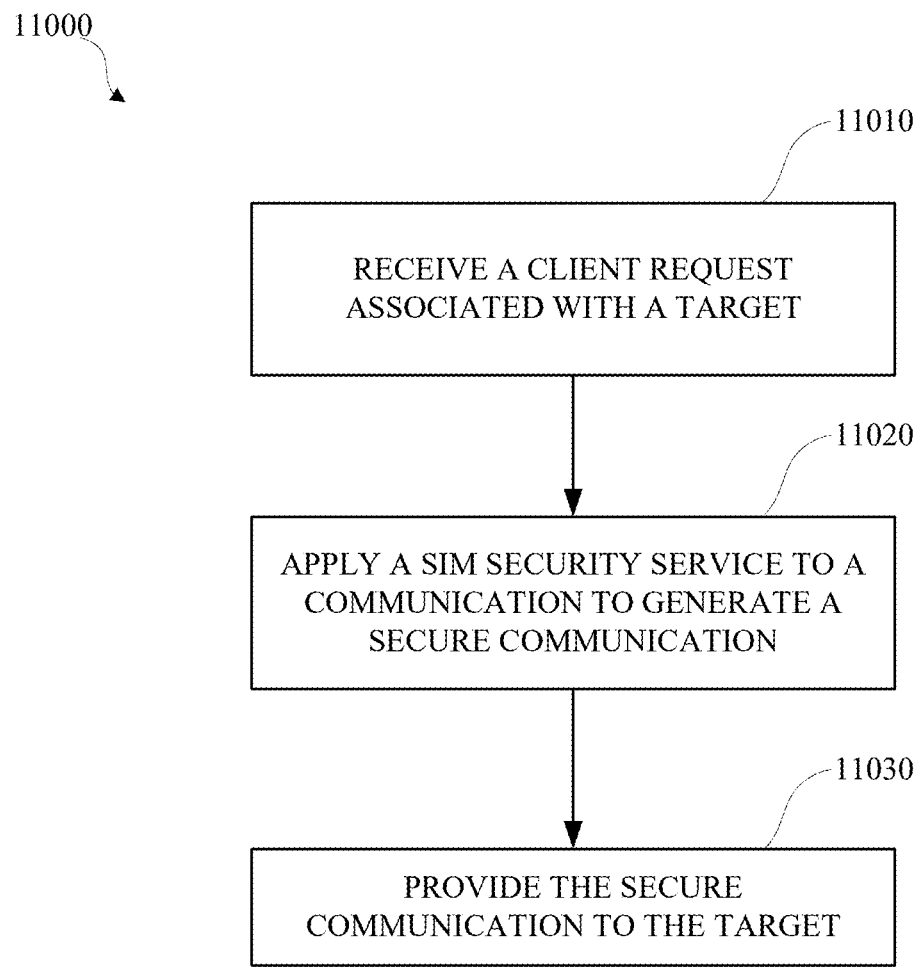
FIG. 11 is a flowchart of a technique for providing a secure SIM networking service.

FIG. 11 is a flowchart of a technique 11000 for providing a secure SIM networking service. The technique 11000 can be executed using computing devices, such as the systems, hardware, and software described with respect to FIGS. 1-8. The technique 11000 can be implemented, for example, as a software program that may be executed by computing devices such as the computing device 1000 of FIG. 1. The software program can include machine-readable instructions that may be stored in a memory such as the memory 1300, and that, when executed by a processor, such as the processor 1200, may cause the computing device 1000 to perform the technique 11000. The technique 11000 may be implemented at least in part by an intermediary system, such as, for example, the intermediary system 5040 shown in FIG. 5, the intermediary system 4050 shown in FIG. 4, or the intermediary system 3040 shown in FIG. 3. The technique 11000 can be implemented using specialized hardware or firmware. Multiple processors, memories, or both, may be used.

At 11010, the technique 11000 includes receiving, by PoP, a client request associated with a target. At 11020, the technique 11000 includes receiving, from a security service platform, service information associated with an SIM security service, the service information including first metadata associated with the request and second metadata associated with the client device. At 11030, the technique 11000 includes providing, based on the request and the SIM security service, a secure communication to the target.

In some implementations, the first metadata includes at least one of an MSISDN associated with the client, an ICCID associated with an eSIM component of the client device, an IP address associated with the client device, or location information associated with the client device. In some implementations, the second metadata includes at least one of an MSISDN associated with the client device, an ICCID associated with an eSIM component of the client device, an IP address associated with the client device, or an IP address associated with the service provider.

In some implementations, the technique 11000 includes receiving user input indicative of an exit point, where the secure request is based on the exit point. In some implementations, the exit point is associated with at least one of a virtual private network or a location. In some implementations, the technique 11000 includes receiving first metadata associated with the request and receiving second metadata associated with the client device, where the secure request is based on the first metadata and the second metadata. In some implementations, the technique 11000 includes determining, based on the SIM security service, a routing path associated with a VPN. In some implementations, providing the secure request to the target includes transmitting, based on the routing path, the secure request to the VPN.

Figure 12:
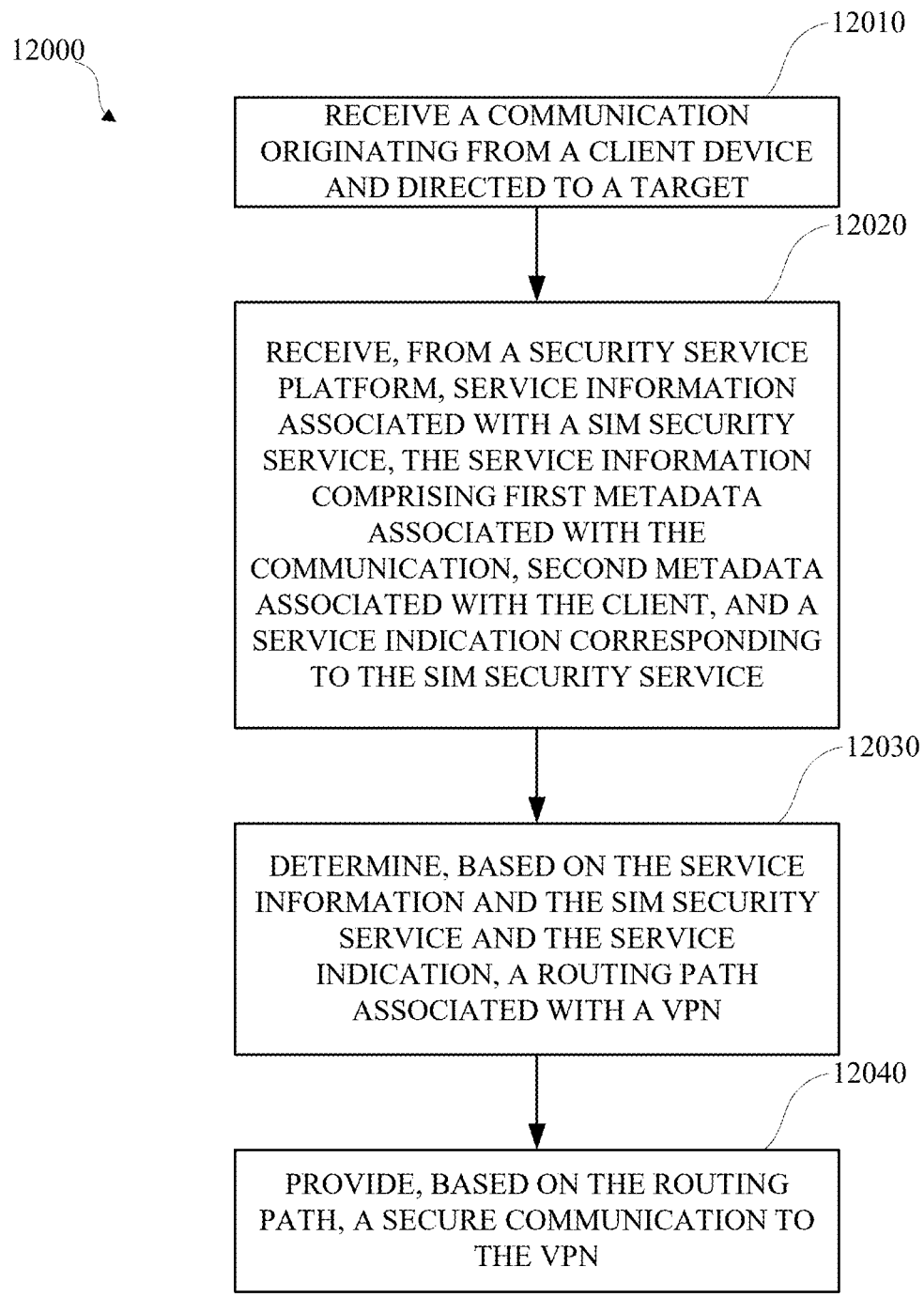
FIG. 12 is a flowchart of a technique for providing a secure SIM networking service.

FIG. 12 is a flowchart of a technique 12000 for providing a secure eSIM networking service. The technique 12000 can be executed using computing devices, such as the systems, hardware, and software described with respect to FIGS. 1-8. The technique 12000 can be implemented, for example, as a software program that may be executed by computing devices such as the computing device 1000 of FIG. 1. The software program can include machine-readable instructions that may be stored in a memory such as the memory 1300, and that, when executed by a processor, such as the processor 1200, may cause the computing device 1000 to perform the technique 12000. The technique 12000 may be implemented at least in part by an intermediary system, such as, for example, the intermediary system 5040 shown in FIG. 5, the intermediary system 4050 shown in FIG. 4, or the intermediary system 3040 shown in FIG. 3. The technique 12000 can be implemented using specialized hardware or firmware. Multiple processors, memories, or both, may be used.

At 12010, the technique 12000 includes receiving, by PoP, a communication originating from a client device and directed to a target. At 12020, the technique 12000 includes receiving, from a security service platform, service information associated with an SIM security service, the service information including first metadata associated with the request, second metadata associated with the client device, an IP address associated with the client device, and a service indication corresponding to the SIM security service. At 12030, the technique 12000 includes determining, based on the service information and the SIM security service and the service indication, a routing path associated with a VPN. At 12040, the technique 12000 includes providing, based on the routing path, a secure request to the VPN.

In some implementations, the first metadata includes at least one of an MSISDN associated with the client device, an ICCID associated with an eSIM component of the client device, or location information associated with the client device. In some implementations, the second metadata includes at least one of an MSISDN associated with the client device, an ICCID associated with an eSIM component of the client device, an IP address associated with the client device, or an IP address associated with the service provider.

Unless expressly stated, or otherwise clear from context, the terminology "computer," and variations or wordforms thereof, such as "computing device," "computing machine," "computing and communications device," and "computing unit," indicates a "computing device," such as the computing device 1000 shown in FIG. 1, that implements, executes, or performs one or more aspects of the methods and techniques described herein, or is represented by data stored, processed, used, or communicated in accordance with the implementation, execution, or performance of one or more aspects of the methods and techniques described herein.

Unless expressly stated, or otherwise clear from context, the terminology "instructions," and variations or wordforms thereof, such as "code," "commands," or "directions," includes an expression, or expressions, of an aspect, or aspects, of the methods and techniques described herein, realized in hardware, software, or a combination thereof, executed, processed, or performed, by a processor, or processors, as described herein, to implement the respective aspect, or aspects, of the methods and techniques described herein. Unless expressly stated, or otherwise clear from context, the terminology "program," and variations or wordforms thereof, such as "algorithm," "function," "model," or "procedure," indicates a sequence or series of instructions, which may be iterative, recursive, or both.

Unless expressly stated, or otherwise clear from context, the terminology "communicate," and variations or wordforms thereof, such as "send," "receive," or "exchange," indicates sending, transmitting, or otherwise making available, receiving, obtaining, or otherwise accessing, or a combination thereof, data in a computer accessible form via an electronic data communications medium.

To the extent that the respective aspects, features, or elements of the devices, apparatus, methods, and techniques described or shown herein, are shown or described as a respective sequence, order, configuration, or orientation, thereof, such sequence, order, configuration, or orientation is explanatory and other sequences, orders, configurations, or orientations may be used, which may be include concurrent or parallel performance or execution of one or more aspects or elements thereof, and which may include devices, methods, and techniques, or aspects, elements, or components, thereof, that are not expressly described herein, except as is expressly described herein or as is otherwise clear from context. One or more of the devices, methods, and techniques, or aspects, elements, or components, thereof, described or shown herein may be omitted, or absent, from respective embodiments.

The figures, drawings, diagrams, illustrations, and charts, shown and described herein express or represent the devices, methods, and techniques, or aspects, elements, or components, thereof, as disclosed herein. The elements, such as blocks and connecting lines, of the figures, drawings, diagrams, illustrations, and charts, shown and described herein, or combinations thereof, may be implemented or realized as respective units, or combinations of units, of hardware, software, or both.

Unless expressly stated, or otherwise clear from context, the terminology "determine," "identify," and "obtain," and variations or wordforms thereof, indicates selecting, ascertaining, computing, looking up, receiving, determining, establishing, obtaining, or otherwise identifying or determining using one or more of the devices and methods shown and described herein. Unless expressly stated, or otherwise clear from context, the terminology "example," and variations or wordforms thereof, such as "embodiment" and "implementation," indicates a distinct, tangible, physical realization of one or more aspects, features, or elements of the devices, methods, and techniques described herein. Unless expressly stated, or otherwise clear from context, the examples described herein may be independent or may be combined.

Unless expressly stated, or otherwise clear from context, the terminology "or" is used herein inclusively (inclusive disjunction), rather than exclusively (exclusive disjunction). For example, unless expressly stated, or otherwise clear from context, the phrase "includes A or B" indicates the inclusion of "A," the inclusion of "B," or the inclusion of "A and B." Unless expressly stated, or otherwise clear from context, the terminology "a," or "an," is used herein to express singular or plural form. For example, the phrase "an apparatus" may indicate one apparatus or may indicate multiple apparatuses. Unless expressly stated, or otherwise clear from context, the terminology "including," "comprising," "containing," or "characterized by," is inclusive or open-ended such that some implementations or embodiments may be limited to the expressly recited or described aspects or elements, and some implementations or embodiments may include elements or aspects that are not expressly recited or described.

As used herein, numeric terminology that expresses quantity (or cardinality), magnitude, position, or order, such as numbers, such as 1 or 20.7, numerals, such as "one" or "one hundred," ordinals, such as "first" or "fourth," multiplicative numbers, such as "once" or "twice," multipliers, such as "double" or "triple," or distributive numbers, such as "singly," used descriptively herein are explanatory and non-limiting, except as is described herein or as is otherwise clear from context. For example, a "second" element may be performed prior to a "first" element, unless expressly stated, or otherwise clear from context.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:
   receiving, by an intermediary system between an access network and a target, a communication originating from a client device and directed to the target;
   generating a secure communication based on application of a subscriber identification module (SIM) security service to the communication; and
   providing the secure communication to the target.

2. The method of claim 1, wherein generating the secure communication comprises at least one of:
   applying a security policy to the communication,
   applying an optimization policy to the communication, or
   establishing a connection between the client device and the target.

3. The method of claim 1, wherein providing the secure communication to the target comprises transmitting one or more protocol data units received from the client device and addressed to the target.

4. The method of claim 1, wherein the intermediary system is implemented between a service provider and the target.

5. The method of claim 1, further comprising:
   receiving user input, originating from the client device, indicative of an exit point associated with at least one of a virtual private network or a location, wherein the SIM security service is based on the exit point.

6. The method of claim 5, wherein the intermediary system comprises a security service platform and at least one of a point of presence (PoP) or a virtual private network (VPN), the method further comprising:
   receiving, by the security service platform and from a service provider, first information associated with the communication; and
   accessing, by the security service platform, second information associated with the client device, wherein the SIM security service is based on the first information and the second information.

7. The method of claim 6, wherein the security service platform comprises a service engine, the method further comprising:
   selecting, by the service engine and based on at least one of the second information and the SIM security service, a point of presence (PoP) of a PoP system,
   wherein providing the secure communication to the target comprises:
      transmitting the secure communication to the PoP for routing to the target.

8. The method of claim 1, further comprising:
   determining, based on the SIM security service, a routing path associated with a virtual private network (VPN), wherein providing the secure communication to the target comprises:
      transmitting, based on the routing path, the secure communication to the VPN.

9. The method of claim 1, further comprising:
   providing, to the client device, experience service information associated with the SIM security service.

10. The method of claim 9, wherein the experience service information is indicative of at least one of a statistical measure associated with the SIM security service, a performance metric associated with the SIM security service, or a security threat prevented by the application of the SIM security service.

11. The method of claim 1, further comprising:
providing, to the client device, an experience service interface configured to facilitate interaction between the client device and an experience service component; and
receiving, via the experience service interface, a user input associated with a configuration corresponding to the SIM security service, wherein the application of the SIM security service is based on the configuration.

12. A device, comprising:
one or more memories; and
one or more processors communicatively coupled with the one or more memories, the one or more processors configured to execute instructions stored in the one or more memories to cause the device to:
receive, from a client device and by an intermediary system between an access network and a target, a client request associated with a target;
receive, from the client device, a communication addressed to the target;
apply, based on the client request, a subscriber identification module (SIM) security service to the communication to generate a secure communication; and
provide the secure communication to the target.

13. The device of claim 12, wherein the SIM security service is associated with at least one of a point of presence (PoP) system or a virtual private network (VPN).

14. The device of claim 12, wherein the one or more processors are configured to execute the instructions to further cause the device to:
receive, from the client device, user input indicative of an exit point, wherein the secure communication is based on the exit point.

15. The device of claim 12, wherein the intermediary system comprises a security service platform and at least one of a point of presence (PoP) system or a virtual private network (VPN), and wherein the one or more processors are configured to execute the instructions to further cause the device to:
receive, from a service provider, first metadata associated with the request; and
access second metadata associated with the client device, wherein the secure communication is based on the first metadata and the second metadata.

16. The device of claim 15, wherein the intermediary system comprises a security service platform and wherein at least a portion of the second metadata is stored in a data store of the security service platform.

17. The device of claim 15, wherein the intermediary system comprises a security service platform that comprises a service engine, and wherein the one or more processors are configured to execute the instructions to further cause the device to:
generating, by the service engine, service information comprising the first metadata, the second metadata, and a service indication corresponding to the SIM security service.

18. One or more non-transitory computer-readable media storing instructions operable to cause one or more processors to perform operations comprising:
receiving, by an intermediary system between a service provider and a target, a communication originating from a client device and directed to a target;
generating a secure communication based on a subscriber identification module (SIM) security service; and
providing the secure communication to the target.

19. The one or more non-transitory computer-readable media of claim 18, the operations further comprising:
receiving, from the service provider, first information associated with the communication; and
accessing second information associated with the client device.

20. The one or more non-transitory computer-readable media of claim 19, wherein at least one of the first information or the second information comprises at least one of a mobile station international subscriber directory number (MSISDN) associated with the client device, an integrated circuit card identifier (ICCID) associated with an SIM component of the client device, an internet protocol (IP) address associated with the client device, an IP address associated with the service provider, or location information associated with the client device.

* * * * *